US012811990B2

(12) United States Patent
Jadhav et al.

(10) Patent No.: US 12,811,990 B2
(45) Date of Patent: Nov. 24, 2026

(54) SYSTEMS AND METHODS OF CONTROLLING DIGITAL COMMUNICATIONS OVER A NETWORK

(71) Applicant: Walmart Apollo, LLC, Bentonville, AR (US)

(72) Inventors: Shreyas Saiprasad Jadhav, San Francisco, CA (US); Shengwei Tang, San Jose, CA (US); Shuling He, San Jose, CA (US); Priyank Gupta, Duvall, WA (US); Pratik Saha, Dublin, CA (US); Selene Xu, San Francisco, CA (US); Hyun Duk Cho, San Francisco, CA (US); Praveenkumar Kanumala, Newark, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 98 days.

(21) Appl. No.: 19/041,748

(22) Filed: Jan. 30, 2025

(65) Prior Publication Data

US 2026/0222455 A1 Jul. 30, 2026

(51) Int. Cl.
*H04L 41/16* (2022.01)
*H04L 65/1089* (2022.01)
(Continued)

(52) U.S. Cl.
CPC .......... *H04L 65/1089* (2013.01); *H04L 41/16* (2013.01); *H04L 65/1096* (2013.01); *H04L 65/80* (2013.01); *G06F 12/0813* (2013.01)

(58) Field of Classification Search
CPC . H04L 65/1089; H04L 41/16; H04L 65/1096; H04L 65/80; G06F 12/0813
(Continued)

(56) References Cited

U.S. PATENT DOCUMENTS 11,704,898 B2 * 7/2023 Jelveh .................... G06F 18/41 382/159
2012/0323682 A1 * 12/2012 Shanbhag .......... G06Q 30/0641 705/14.66

(Continued)

FOREIGN PATENT DOCUMENTS

CN 117828491 A 4/2024

*Primary Examiner* — Ario Etienne
*Assistant Examiner* — Kidest Mendaye
(74) *Attorney, Agent, or Firm* — Fitch, Even, Tabin & Flannery LLP

(57) ABSTRACT

Some embodiments provide systems to control digital communications comprising: a transceiver; a processing resource; and a medium storing instructions executed to cause the processing resource to: during a current session, determine acquisition execution intent prediction features; trigger a query to a first trained model; identify a first inferred acquisition execution type based on the acquisition execution intent prediction features; repeatedly evaluate according to a predefined interval whether to trigger a refresh of the first inferred acquisition execution type; trigger a first refresh query; identify, using the first trained model, a second inferred acquisition execution type; identify a set of one or more items corresponding to the in-session search; filter the set to a sub-set of items that satisfy the search and comply with the second inferred acquisition execution type; and control the data communications transceiver to transmit response data in controlling the remote client computing device to render content.

20 Claims, 8 Drawing Sheets

(51) Int. Cl.

*H04L 65/1096* (2022.01)
*H04L 65/80* (2022.01)
*G06F 12/0813* (2016.01)

(58) Field of Classification Search

USPC .......................................................... 709/228
See application file for complete search history.

(56) References Cited

U.S. PATENT DOCUMENTS

| | | | | |
|---|---|---|---|---|
| 2018/0232776 | A1 | 8/2018 | Lin | |
| 2022/0358570 | A1* | 11/2022 | Agrawal ............ | G06Q 30/0643 |
| 2023/0245215 | A1* | 8/2023 | Subrahmannian ........................... | G06Q 30/0635 705/26.64 |
| 2023/0401622 | A1 | 12/2023 | Rao | |
| 2025/0307877 | A1* | 10/2025 | Craft ...................... | G06Q 10/02 |
| 2026/0030590 | A1* | 1/2026 | Mehta ................ | G06Q 10/0874 |
| 2026/0057430 | A1* | 2/2026 | Vaduthalakuzhy .......................... | G06Q 30/0631 |
| 2026/0141250 | A1* | 5/2026 | Liu ........................ | G06N 3/045 |
| 2026/0162168 | A1* | 6/2026 | Oliver .............. | G06Q 30/06311 |
| 2026/0178967 | A1* | 6/2026 | Karuturi ................ | G06N 20/00 |

* cited by examiner

SYSTEMS AND METHODS OF CONTROLLING DIGITAL COMMUNICATIONS OVER A NETWORK

TECHNICAL FIELD

This disclosure relates generally to control digital communications in controlling user computing devices.

BACKGROUND

There are many systems that respond to queries. Some of these systems are Internet systems receiving queries over the Internet. These systems can provide information relevant to the queries. There is a need, however, to improve the communications and content in response to these queries.

BRIEF DESCRIPTION OF DRAWINGS

Disclosed herein are embodiments of systems, apparatuses and methods pertaining to controlling digital communications in controlling user computing devices. This description includes drawings, wherein.

Figure 1:
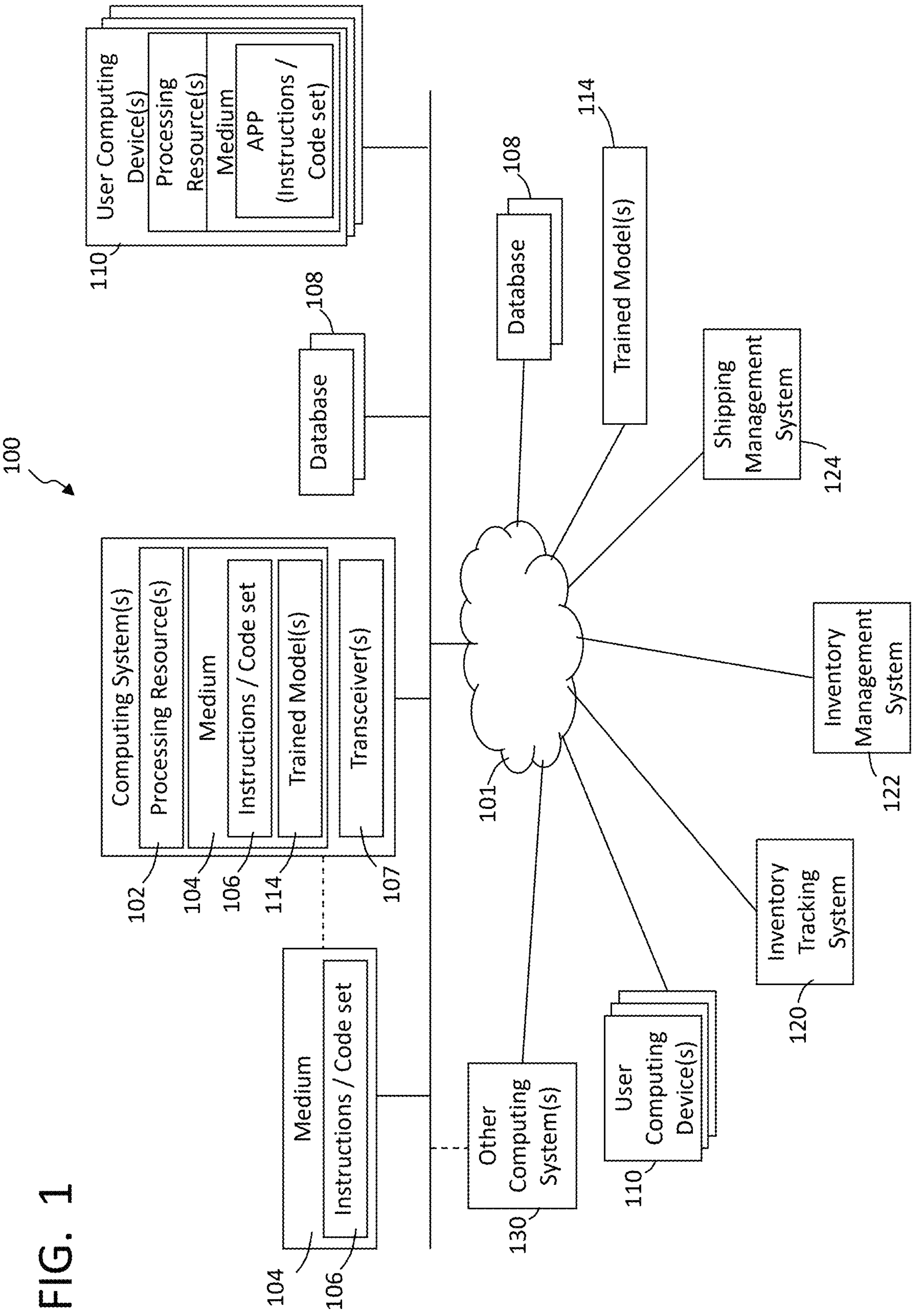
FIG. 1 illustrates a block diagram of an example communications control system that controls digital communications between electronic system components over one or more distributed networks, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of example embodiments. Reference throughout this specification to "one embodiment," "an embodiment," "some embodiments", "an implementation", "some implementations", "some applications", or similar language means that a particular feature, structure, or characteristic described in connection with the embodiment is included in but is not limited to at least one embodiment of the disclosure. Thus, appearances of the phrases "in one embodiment," "in an embodiment," "in some embodiments", "in some implementations", and similar language throughout this specification may, but do not necessarily, all refer to the same embodiment.

Present embodiments address well known network and Internet problems of delayed response and latency problems in responding to inquiries. Some present embodiments in part utilize processing resources to asynchronously process relevant information during a current network session to improve response time while further improving response results based in part on more accurate predictions of a user's intent, such as for example a user's intended fulfillment types by which a user intends to receive one or more items. The processing resources, in part utilizing asynchronous execution, overcome some well known network and Internet-centric problems in responding to queries, and greatly increase an available processing time in order to provide more accurate predictions of intended fulfillment types during current sessions. The processing resources further address these well known network and Internet-centric problems in part by caching a predicted inferred fulfillment type for a current session that enables rapid response to queries by using the cached predicted intended fulfillment type in controlling communications and the information presented to the user in response to the queries, and/or providing the fulfillment type to an application for use in managing content.

Figure 2:
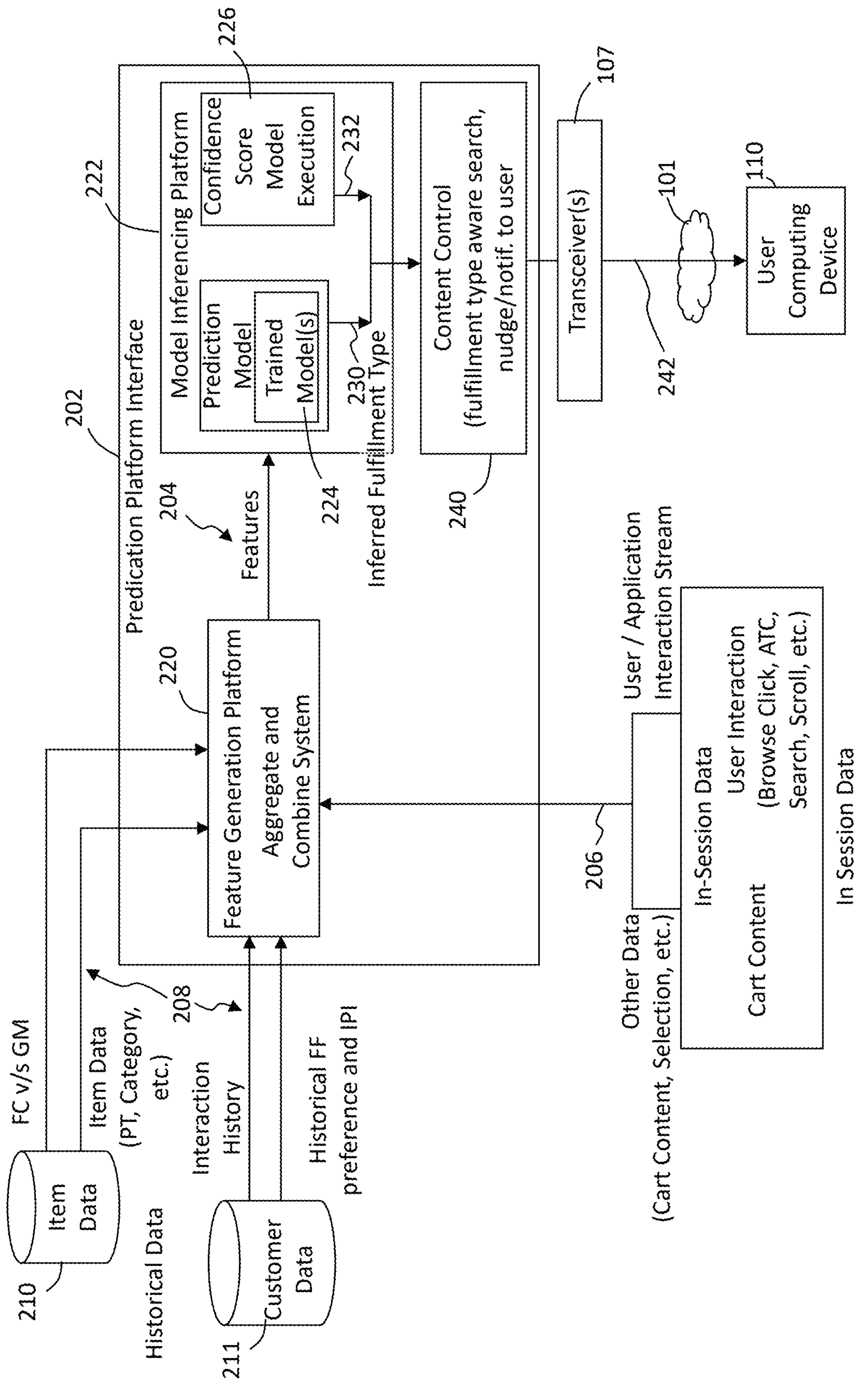
FIG. 2 illustrates a block diagram of an example prediction platform interface, in accordance with some embodiments.

FIG. 1 illustrates a block diagram of an example communications control system 100 that controls digital communications between electronic system components over one or more distributed networks 101, in accordance with some embodiments. FIG. 2 illustrates a block diagram of an example prediction platform interface 202, in accordance with some embodiments, which can be implemented through one or more of the electronic processing resources executing instructions and utilizing machine learning models. The system 100 can include one or more electronic processing resources 102 that may include one or more microcontrollers, one or more microprocessors, one or more central processing unit cores, one or more application-specific integrated circuits (ASIC), one or more servers, one or more field programmable gate arrays (FPGA), control logic, other such systems or a combination of two or more of such systems. The communications control system 100 further includes a machine readable medium 104 that may be non-transitory and include for example one or more random access memory (RAM), one or more read-only memory (ROM), one or more electrically erasable programmable read-only memory (EEPROM), one or more flash memory, one or more hard disk drives, other such mediums, or a combination of two or more of such mediums. Some or all of the medium 104 include one or more databases accessible via the network 101 that maintains and stores relevant data. Further, the medium 104 may be part of the processing resource, external to and accessible to the processing resource 102, or a combination of internal and external mediums. Additionally, one or more mediums may be remote and provide distributed and/or redundant storage. The one or more distributed networks 101 can be substantially any relevant wired and/or wireless computer and/or communications networks (one or more local area networks (LAN), one or more wireless area networks (WAN), one or more other wireless networks (e.g., cellular, Wi-Fi, Bluetooth, LoRa, LoRa-WAN, etc.), other such networks, or a combination of two or more of such networks).

The processing resource 102 may execute instructions 106 (e.g., programming or software code) stored on machine readable medium 104 that when executed by processing resource 102 causes the processing resource to perform functions of the communications control system 100. Additionally or alternatively, the processing resource 102 may include electronic circuitry for performing some or all of the functionality described herein. The communications control system 100 may also include other hardware components, such as physical storage (e.g., hard disk drive, a solid state drive, or the like, or a plurality of such storage devices (e.g., an array of disks)), and may be locally attached (i.e., installed) in the communications control system 100. In some implementations, physical storage may be accessed as a block storage device. The processing resource is communicatively coupled with and/or controls one or more wired and/or wireless data communications transceivers 107, transmitters and/or receivers that communicatively coupled with the one or more distributed communications networks 101. The processing resource 102 is communicatively coupled with the one or more transceivers 107 and control communicates from and/or to the processing resource and/or at least some communications from and/or to the communications control system 100 to manage at least the response to queries, data distribution, retrieve information, and/or other such communications.

The communications control system 100 includes and/or is communication with one or more internal and/or external database 108 that can store data for use by the processing resource 102, other local systems and/or remote systems. Further, the databases may be part of the processing resource 102, the medium 104 and/or one or more separate mediums. The communications control system 100 typically further includes and/or is accessible by numerous user computing devices 110 (e.g., computer, laptop, tablet, smartphone, user wearable system, etc.) that are used by users to acquire information in response to different types of queries, such as queries for item information (e.g., products, components, parts, systems, etc.), information about a person or group of people, information about an entity, pricing information, sales transaction information, financial transaction information, entertainment information, sports information, news information, and/or substantially any other relevant information.

In some embodiments, the communications control system 100 can include, be a part of and/or can be communicatively coupled with one or more entities one or more retail entities, Internet data source entities, manufacturing entities, energy distribution entities, investment entities, financial institution entities and/or other such entities. For example, the communications control system 100 may be part of a retail entity that manages retail inventory, the distribution of inventory and/or the sale of inventory. As such, the communications control system 100 can include and/or be communicatively coupled with an inventory tracking system 120 that can track inventory within a facility, expected to be received at the facility and/or distributed and/or sold from the facility, inventory management system 122 that can track inventory between two or more facilities, shipping management system 124 that can manage the distribution of items (e.g., products) from a facility and/or to a facility (e.g., manage shipping to customers), other such systems, and typically a combination of two or more of such systems. The processing resource 102 and/or communications control system 100 may be in communication with one or more other computing systems 130, via one or more wired and/or wireless networks 101 for example. The other computing systems may be similar to the communications control system 100 or other computing systems, and may each include at least a processing resource and a machine readable medium. The computing systems may each execute software (e.g., processing resource executing certain instructions).

The communications control system 100, in part manages and/or controls digital communications between electronic system components over one or more of the distributed networks 101. The processing resource 102 is configured to receive numerous different queries from numerous different applications being executed on different user computing devices 110, other computing systems 130, inventory tracking system 120, inventory management systems 122 and/or other such computing systems attempting to acquire information that is to be utilized by the respective applications. For example, mobile applications (APPs) being executed on users' smartphones, tablets, computers and/or other such user computing devices 110 can include multiple applications that initiate queries for data that can control one or more graphical user interfaces (GUIs) rendering some or all of that information to a user. As a non-limiting example, a product search application of a shopping APP can communicate a query/request for information about one or more products that are offered for sale by a retail entity. In response to that query, the processing resource can respond with data relevant to that query, and that data can include information that can dictate and/or at least partially control how some or all of that data and/or content is presented and/or rendered through the user computing device 110 to the user. In some embodiments, products can be considered one type of item, and a product may be more generically referred to as an item.

Some of that data can include one or more potential fulfillment types defining one or more potential ways that the user may be capable of receiving one or more products should the user purchase one of those products, such as purchase a product through the shopping APP. These potential fulfillment types can include, for example, pickup the product at a retail store, product delivery to a pickup location (e.g., at a retail store, at a fulfillment facility, at a locker system, etc.), product delivered directly to a delivery location (e.g.,. user's home, user's office, etc.), and/or other such fulfillment types. Such fulfillment types can have a significant effect on whether a user might be interested in purchasing a particular product and/or can influence a user's decision in selecting one or more products and/or selecting a product between one or products. As such, the processing resource 102, in some embodiments, in executing the instructions provides a prediction platform interface 202 that implements an in session evaluation of relevant data in attempts to determine or infer a user's intended or preferred fulfillment type specific for the current session. This inferred fulfillment type 230 can then be used to affect the data provided in response to a query and/or can be used to control the user computing device 110 regarding the information presented to the user and/or an order that the information is presented to the user. In some embodiments, a user may be more generically referred as a client.

The determined inferred fulfillment type can be used, in some embodiments, as at least one of the factors in filtering, filtering, prioritizing, conditioning, organizing and/or otherwise adjusting content that controls user computing device 110 in presenting the content in response to an in session action, such as a search for relevant content (e.g., a product search, key word search, image search, etc.). In some embodiments, the processing resource 102, executing the instructions 106, can identify, through a content control platform 240, based on an in-session search in response to the user query received from the user computing device 110, a set of one or more products corresponding to the in-session search. This set of one or more products can further be filtered to a sub-set of one or more products that satisfy the in-session search and that additionally comply with the second inferred fulfillment type. The processing resource 102 can control the data communications transceiver 107 to transmit to the remote user computing device 110, via the one or more distributed networks 101, response data 242 in a predefined standard format consistent with the prediction platform interface in controlling the remote client/user computing device 110 to render content. Typically, the source provide intends content to be presented and/or rendered in a predefined format and/or consistent with a predefined layout in attempts to focus and/or maximize a user's attention to one or more particular areas and/or to particular content. Accordingly, the programming resource can format content and control the data communications transceivers 107 to communicate the content comprising at least the sub-set of one or more products to control the user computing device to present the content with the sub-set of one or more products at least in a prominent results position within the presented and/or rendered content consistent with a predefined layout of the prediction platform interface (e.g., a GUI displayed on a display of the user computing device 110).

In some embodiments, the filtering provides a prioritization of the sub-set of one or more products over one or more additional products initially identified in response to the in-session search. Additionally or alternatively, in some embodiments, the filtering may result in the control of the user computing device 110 to provide information corresponding to only the sub-set of one or more products, while in other instances, the filtering prioritizes the sub-set of one or more products while also providing information for one or more products that are outside of the sub-set.

The prediction of a user's intended fulfillment type for a current session, however, can be difficult because of the extensive amounts of information that have to be processed in an extremely small amount of time. Previous systems merely use a generic default fulfillment type for all or a large group of users, a default type specific to a user, such as defaulting to a user's most recently selected fulfillment type for a most recent purchase. Such defaulting, however, is extremely inaccurate and can adversely affect a user's experience and the information provided to the user in response to the application query. Further, a user's intended fulfillment type varies for a particular current session and/or may be different between different products considered in a single current session. Some systems attempt to evaluate data in attempts to predict an intended fulfillment type for a current session that the user is interacting with the APP and/or a particular one or more sources of data (e.g., a retailer supplying product information in response to product queries). It is a well known problem in Internet technology that a speed of a response to a query is critical to maintaining a user's interaction with a source of information and in identifying information that directly corresponds to the query. Such responses to queries typically have to be less than a second and often less than half a second. Accordingly, there is an extremely limited time available to accurately identify relevant data that may correspond to predicting an intended fulfillment type for a particular user and to evaluate that identified data in order to predict an intended fulfillment type for that user with a threshold degree of accuracy that would allow a data source to rely on that prediction for use in controlling data acquisition and controlling communications to control a client/user computing device in presenting information that aligns with the user's actual intent and desires.

Some previous systems react to a query from an application executed on a user computing device to initiate an evaluation to both identify relevant information that can be used in predicting a current user's intended fulfillment type. These types of evaluations, however, are extremely limited because of the limited time in order to effectively respond to the query with relevant data, and often fail to accurately predict the intended fulfillment type. As a result, the response data provided in response to the query is often inaccurate and adversely affect the content presented to the user.

Present embodiments, however, utilize the processing resource 102 to asynchronous to process relevant information, which may be independent of queries from one or more applications, during a current session in which the user interactions virtually with a content source in determining an intended fulfillment type at least for the current session. By utilizing an asynchronous application, the processing resource overcomes some well known network and Internet-centric problems in responding to queries by in part greatly increasing an available processing time in order to provide much more accurate predictions of a user's intended fulfillment type for the current session. The processing resource further addresses these well known network and Internet-centric problems in part by caching a predicted intended fulfillment type for the current session that enables queries to be quickly responded to in order to use the cached predicted intended fulfillment type in controlling the information presented to the user in response to the queries. Still further, the asynchronous operation enables the processing resource to repeatedly process relevant data over time to periodically update over time the predicted intended fulfillment type for the current session and/or relative to a particular product being considered during the session to continuously ensure over time an accurate prediction for the current session. As the user continues to interact during the session additional information is acquired through those numerous user and application interactions. The processing resource 102 can utilize this additional information over time during the current session with repeated reevaluations and refreshing of the predicted intended fulfillment type for the current session that is predicted to be more accurate for a current session than other seasons and/or a default. This asynchronous operation is irrelevant when taken out of context of a network and/or Internet query because the excessive time constraints that are present in these types of network and/or Internet queries. It is well known that failure to provide results within an extremely limited duration of time with network and/or Internet queries will result in users not using that source of information, which makes the source completely irrelevant and completely destroys the source's ability to continue to operate.

A current session can be a duration where a user, using a user computing device 110, maintains communications over time with a data source through a series of queries from one or more applications executed through one or more APPs being executed on the user computing device. Such a current session can be relatively short, such as less than a minute or even less than 10 seconds when a single query is submitted, can be relatively long with a user maintaining communications through multiple sequential queries that can last tens of minutes to multiple hours or more, and can be substantially any duration in between. For example, it is common with a retail shopping APP that a user maintains a current session for tens of minutes to even hours depending on many factors, including particularly a response time to queries as well as other factors (e.g., number of products a user is shopping for, number and/or types of products available from a data source, types and amounts of information available relative to different products from the retail data source, the presentation of the information to the user, the usability of the GUI and the APP, other such factors and typically a combination of two or more of such factors). As described above, it is a well known Internet-centric and network-centric problem that response time to queries is one of the most significant factors in an effectiveness of a data source in maintaining active current sessions and repeated use by users.

In some embodiments, the instructions stored on the medium, when executed by the processing resource 102, cause the processing resource to determine, during a current session between a user and a prediction platform interface 202, fulfillment intent prediction features 204 based on data, including in session data 206, and stored data 208 received from one or more databases 210, 211. The in session data 206 can be obtained during the current session based on actions executed in the current session by the user and/or one or more applications being executed on the user computing device 110. Such actions can, for example, include trigger actions such as an item being added to a virtual cart, a number of items in a virtual cart, an initiated search for a product, based on keywords and/or other such search, an activation to display particular data (e.g., a webpage corresponding to a product selected by a user), other such triggers or a combination of two or more of such triggers. The stored data can include, for example, historic user data 214, product data 216, and/or other data. The historic user data can include, for example, historic virtual interaction behavior data associated with numerous different users executing respective data retrieval processes including historic searches, historic add to cart actions, historic item acquisition data associated with numerous different purchase transactions by users and respective fulfillment type, of a plurality of potential fulfillment types, for each of the numerous different acquisition transactions (e.g., purchase transactions), days since last interacted, days since last purchase, numbers of transactions implemented using one of the fulfillment types, other such information, and typically a combination of two or more of such information. In some embodiments, the feature generation platform 220 can utilize a streaming technology (e.g., spark streaming technology) to process raw in-session signals and perform feature engineering. In some embodiments, add to cart action may be more generally referred to as an acquisition intention action, historic add to cart may be more generally referred to as historic acquisition intention, a purchase may be more generally referred to as acquisitions, purchase data may be more generally referred to as acquisition data, and purchase transactions may be more generally referred to as acquisition transactions.

Figure 3:
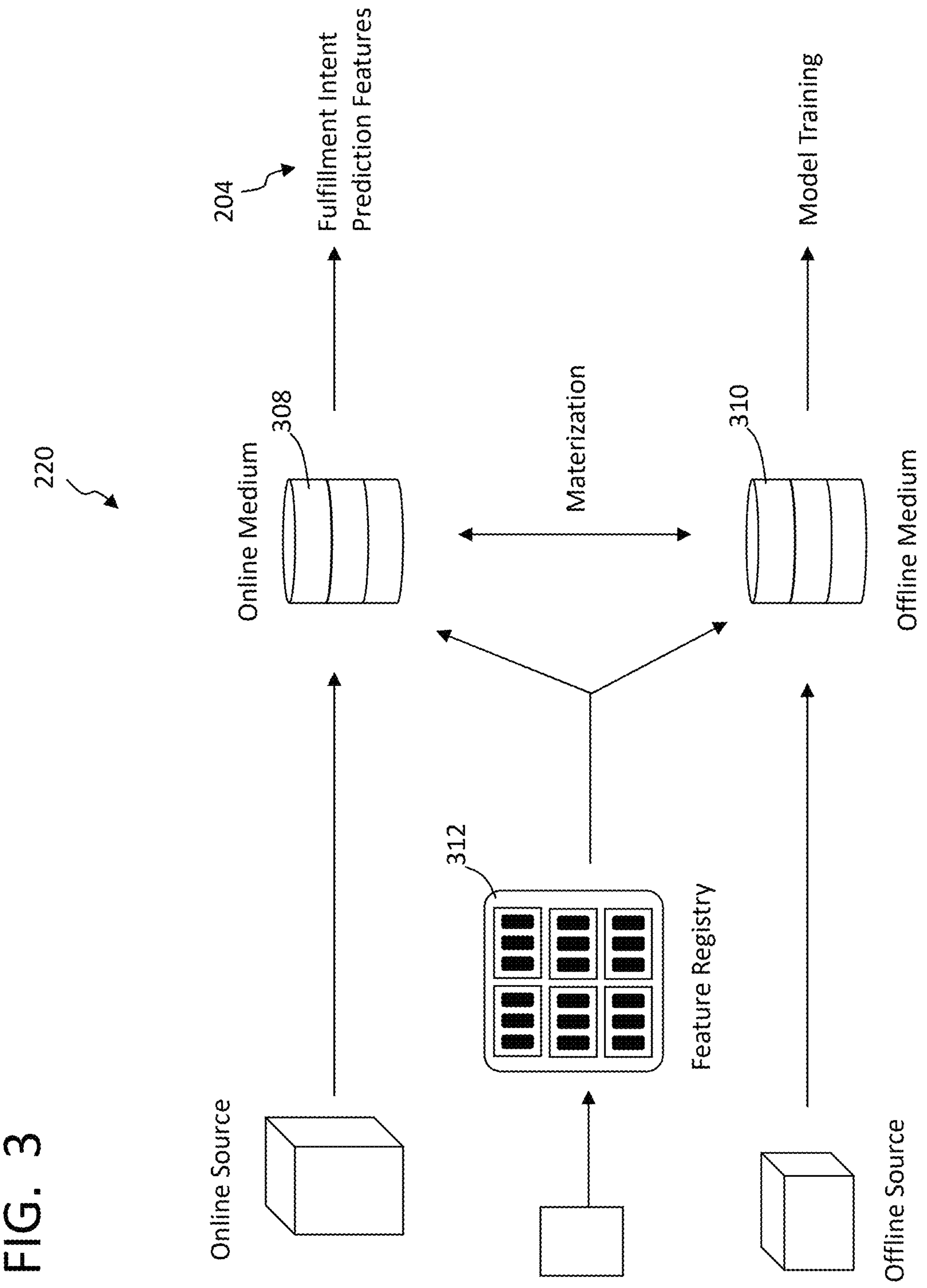
FIG. 3 illustrates a functional block diagram of an example feature generation platform, in accordance with some embodiments.

FIG. 3 illustrates a functional block diagram of an example feature generation platform 220, in accordance with some embodiments. Referring to FIGS. 1-3, the feature generation platform 220 receives at least some real-time in-session data 206, and accesses the historic content 208 apply processing to the combination of information to generate multiple different fulfillment intent prediction features 204. In some embodiments, the feature generation platform 220 can apply one or more algorithms to a combination of different in-session data 206 relative to corresponding historic content 208. Typically, the in-session data 206 is received as a stream of unstructured data that often is rapidly changing. The feature generation platform 220, in part formats the in-session data into a structured format, which in some instances combines the in-session data with historical data. Further, in some embodiments, the feature generation platform 220 may apply the structuring to a predefined duration of historic in-session data, providing a look-back window of time. For example, the feature generation platform 220 can apply processing over a look-back duration window of a most recent 15 minutes of historic in-session data and combine that collection of historical in-session data, which may in some instances additionally be combined with other corresponding historical data, and generate one or more corresponding fulfillment intent prediction features. The duration of the look-back window for different types of in-session data may vary, and the duration of the look-back window may be selected and/or adjusted based on one or more factors. In some embodiments, the processing can include associating a real-time in-session data as a general merchandise item, a Food-and-Consumable item and/or other such labeling. The feature generation platform 220 can in some embodiments additionally generate one or more fulfillment intent prediction features based solely on historic information.

Further, in some embodiments, the processing resource 102 in determining the fulfillment intent prediction features 204 can repeatedly determine, during the current session, the fulfillment intent prediction features at each repetition of a predefined interval of time, and typically not triggered in response to requests from an application. This provides a process of data collection and updates of fulfillment intent prediction features at a periodic timeframe, whereas previous systems waited for requests from downstream applications to start feature generation which significantly reduces capabilities because of the limited time available in order to provide effective responses. As such, the feature generation platform 220 can generate one or more of the fulfillment intent prediction features 204 based on respective predefined interval of time. Additionally, because the processing is not limited to the response time the number of fulfillment intent prediction features and the complexity of fulfillment intent prediction features that can be generated and periodically updated are greatly increased, provides more accurate determination of an inferred fulfillment type that is predicted the user intends to receive one or more products for the current session. Still further, the period updates enable the processing to further enhance the accuracy of the inferred fulfillment type by taking into account the in-session data over time. At each respective interval, the feature generation platform 220 can regenerate a respective one or more of the fulfillment intent prediction features 204. For example, in some embodiments, the predefined interval may be 1-minute, with the feature generation platform 220 regenerating one or more of the fulfillment intent prediction features, in this example, every 1 minute. The regeneration enables asynchronous operation while maintaining the fulfillment intent prediction features current and up to date.

Below are examples of some historical fulfillment intent prediction features that can be generated using historical information 206:

- txn_ratio_delivery: Ratio of transactions that were fulfilled by delivery (lookback window: A duration) (e.g., A=6 months);
- txn_ratio_pickup: Ratio of transactions that were fulfilled by pickup (lookback window: B duration) (e.g., B=6 months);
- txn_ratio_shipping: Ratio of transactions that were fulfilled by shipping (lookback window: C duration) (e.g., C=6 months);
- mean_ipi_delivery: Mean Inter-purchase interval (days between consecutive transactions) fulfilled by delivery (lookback window: D duration) (e.g., D=3 months);
- mean_ipi_pickup: Mean Inter-purchase interval (days between consecutive transactions) fulfilled by pickup (lookback window: F duration) (e.g., F=3 months);
- mean_ipi_shipping: Mean Inter-purchase interval (days between consecutive transactions) fulfilled by shipping (lookback window: G duration) (e.g., G=3 months);
- days_since_last_txn_delivery: Days between the last transaction fulfilled by delivery and current date (lookback window: H duration) (e.g., H=3 months);
- days_since_last_txn_pickup: Days between the last transaction fulfilled by pickup and current date (lookback window: I duration) (e.g., I=3 months);
- days_since_last_txn_shipping: Days between the last transaction fulfilled by shipping and current date (lookback window: J duration) (e.g., J=3 months).

The lookback windows, in some embodiments, are configurable to enable adjustment depending on one or more factors.

Similarly, below are some examples of fulfillment intent prediction features generated based at least in part on real-time in-session data and/or historic in-session data relative to a respective look-back duration window relative to at least that feature:

- item_cnt_vw: Count of items viewed in the most recent K duration (e.g., K=15 minute)
- FC_count_vw: Count of Food & Consumable items viewed in the most recent L duration (e.g., L=15 minutes)
- item_cart_context: Count of items currently in cart in the most recent M duration (e.g., M=15 minute)
- FC_cart_context: Count of Food & Consumable items currently in cart in the most recent N duration (e.g., N=15 minute)
- item_count_search: Count of items searched in the most recent O duration (e.g., O=15 minute)
- FC_count_search: Count of Food & Consumable items searched in the most recent P duration (e.g., P=15 minute)

The lookback windows, in some embodiments, are configurable, enabling adjustment depending on one or more factors. Other durations can be set, and the durations for different fulfillment intent prediction features can be different.

In some embodiments, the feature generation platform 220 can generate additional features based at least in part on previously generated fulfillment intent prediction features and/or generate features as a function of other fulfillment intent prediction features. For example, in some embodiments, the feature generation platform can generate a feature:

#item fulfillment trend: Item fulfillment ratio txn based [Delivery, Pickup, Shipping].

For one or more or each product or item, the feature generation platform 220 can generate a vector of 3 scores for each fulfillment type (e.g., fulfillment types: Delivery, Pickup, Shipping). Each score can be the ratio of transactions which contained that item fulfilled by the fulfillment option in the last X duration (e.g., X=last 3 months). For example, the vector for an item1 can be:

[item1, 0.2, 0.4, 0.4]

In this example, item1 was fulfilled by: delivery 20% of the time, by pickup 40% of the time, and by shipping 40% of the time. A similar item vector can be generated for multiple if not all the items transacted in the last 3 months and store that vector (e.g., in a Hive Table) in one or more databases 108.

The feature generation platform 220, in some embodiments, can utilize these item vectors in generating one or more of the fulfillment intent prediction features. For example, the feature generation platform can, in some embodiments, generate based on items viewed within a predefined, limited item lookback period or duration:

- item_vec_vw: Item vectors for each of the items viewed or consider over the item lookback period (e.g., when 3 items were viewed in the last 15 mins, [item1, item2, item3], the items view vector feature can be generated by looking up corresponding item vectors from the table of item vectors: [item1, 0.2, 0.4, 0.4], [item2, 0.1, 0.9, 0.0], [item3, 0.8, 0.1, 0.1]).
- avg(all viewed items): can be generated as an average of the vectors across the viewed items (e.g., 3 items) to get the feature (e.g., avg(all viewed items): [1.1/3, 1.4/3, 0.5/3]).
- item_vec_atc: Item vectors (similar to item_vec_vw) for each of the items that were added to a virtual cart (add-to-cart action) over an item added lookback period.
- item_vec_search: Item vectors (similar to item_vec_vw) for each of the items that were searched for by the user over a search added lookback period.

As described above, the feature generation platform 220 can, in some embodiments, execute asynchronous feature processing according to one or more predefined time periods of data collection to provide feature updates at repeated periodic timeframes during the session allowing more time processing for features to be generated and processed. This increased time at least in part allows for additional and/or more complex features to be generated, which can then be utilized in more accurately predicting a user's intended fulfillment type for the current session and/or for one or more items of the current session, as well as more accurately predicting a change in an intended fulfillment type during the session. Further, in some embodiments, the asynchronous process allows the system to utilize consider historic in-session data over one or more predefined look back periods of time in cooperation with the predefined intervals (e.g., 1 minute) refresh update to provide the ability to generate more accurate, additional and more complex features and previous methods. One or more of the lookback windows can be flexible and/or adjustable, which can be advantageous for some features, including some in-session features (e.g., Items added-to-cart (ATC) in the last x minutes (total items and/or just food-and-consumable items), Items viewed in the last x minutes (total items and/or just food-and-consumable items), Items searched in the last x minutes (total items and/or just food-and-consumable items), etc.). In some embodiments, the feature updating for selection one or more of the fulfillment intent prediction features can additionally be triggered by predefined actions and/or triggers, which can allow the processing and updating to be implemented in real-time providing the system with the ability to operate asynchronously, as well as in real time in response to one or more preselected triggers. In some embodiments, during a current session between a user computing device and a prediction platform interface 202, the processing resource in executing instructions can determine fulfillment intent prediction features 204 at the predefined interval rate and based on data received from one or more databases 210, 211 of historic user data and in session data 206 obtained during the current session based on actions executed in the current session.

The generated fulfillment intent prediction features 204 can, in some embodiments, be stored and/or cached in one or more mediums and/or partitions of a medium. For example, the fulfillment intent prediction features can be maintained and updated in: (1) an online feature medium 308; and (2) an offline feature medium 310. The fulfillment intent prediction features in the online feature medium can be utilized and/or consumed by the model inferencing platform 222 of the prediction platform interface 202 for model inferencing. In some embodiments, the fulfillment intent prediction features maintained in the (2) offline feature medium 310 can be in machine learning model training and/or retraining over time to generate modified, updated trained models 114 expected to provide more accurate results. In some embodiments, the platform interface 202 includes a feature registry 312 that monitors and/or ensures that the fulfillment intent prediction features 204 in the online feature medium 308 and the offline feature medium 310 are consistent. It is noted that in previous systems that attempt to predict an intended fulfillment type (or predicted preference), there is no need for the concept of feature storage because the generation of features and any inference are done on a single logic layer with features simply passed to an inference system on the same system logic layer.

Figure 4:
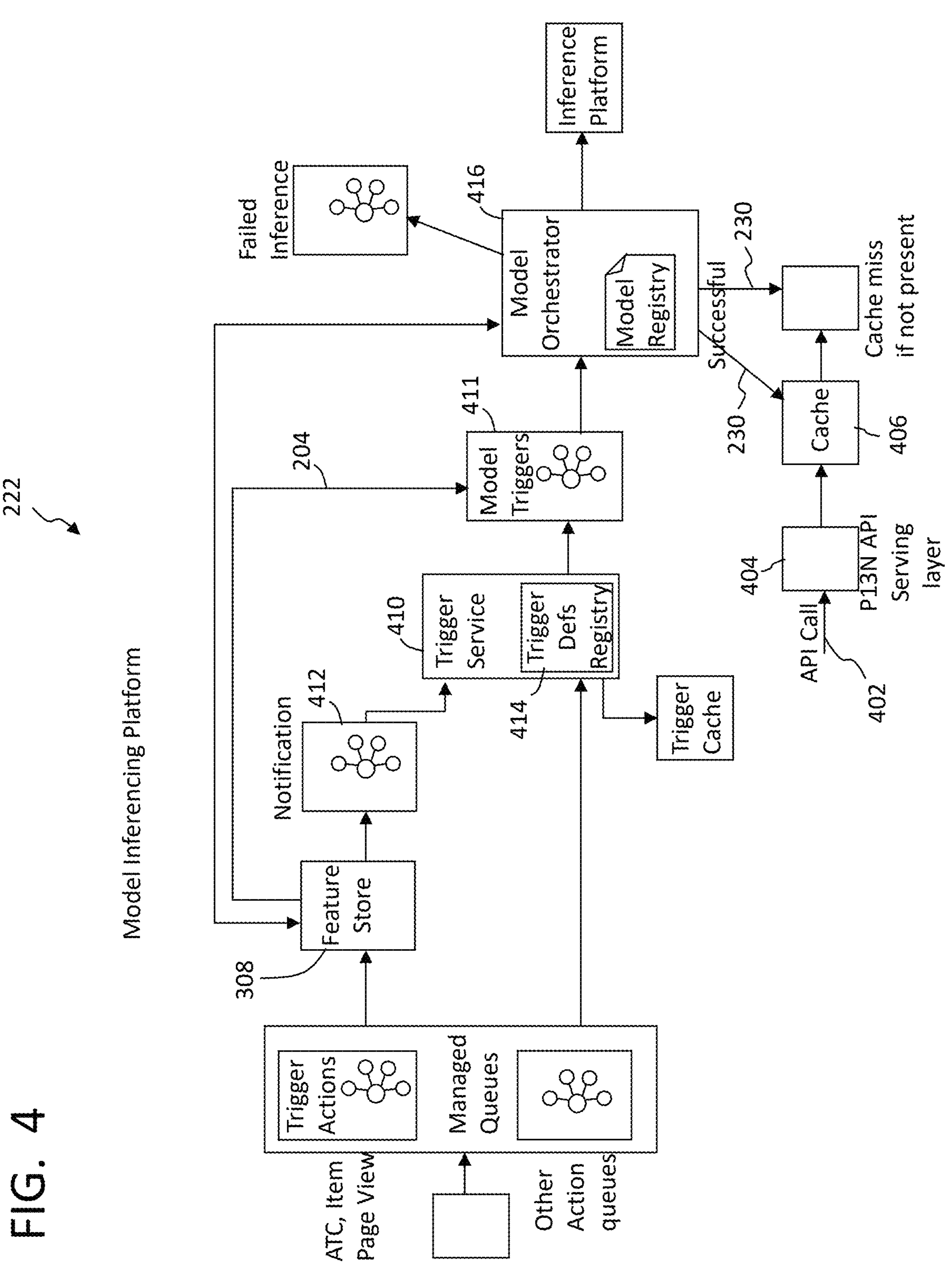
FIG. 4 illustrates a functional block diagram of an example model inferencing platform implemented through the processing resource executing the instructions, in accordance with some embodiments.

FIG. 4 illustrates a functional block diagram of an example model inferencing platform 222 implemented through the processing resource 102 executing the instructions 106, in accordance with some embodiments. Referring to FIGS. 1-4, the processing resources 102 when executing the instructions 106 can trigger a model query to one or more machine learning first trained models 224. The first trained model is trained using a corpus of data regarding user historic interactions and/or queries with one or more data sources, which can include for example, historic data corresponding to shopping sessions where users access item information, submitted search queries regarding products, historic add to cart data, users' session acquisition histories, users' retail store facility purchases, previous selected fulfillment types corresponding to pending virtual carts and/or completed session acquisition transactions, historic available fulfillment types corresponding to items viewed, added to cart, purchases and the like, other such information, and typically a combination of two or more of such information. The first trained model 224 is further repeatedly retrained over time using feedback information (e.g., detected accurate fulfillment type predictions, detected inaccurate fulfillment type predictions, direct user feedback, changes to product and/or inventory information, other such data, and typically a combination of two or more of such data). The retraining produces new or modified trained models that are predicted to provide more accurate results. The model query, in some embodiments, can including the fulfillment intent prediction features 204 and/or directs the first trained model to access the generated fulfillment intent prediction features 204, for example in some embodiments from the feature medium 308. Based at least on the fulfillment intent prediction features 204 the first trained model 224 can generate an inferred fulfillment type 230 of the user and the current session. In some embodiments, an add to cart action may be more generically referred as an acquisition intention action, and purchases may be more generally referred to as acquisitions.

The process resource 102, using the first trained model 224, identifies a first inferred fulfillment type 230, of the plurality of potential fulfillment types, that is predicted the user intends to receive a product ordered during the current session based on the fulfillment intent prediction features 202. As introduced above, the application of the first trained model can be implemented in an asynchronous operation that is not restricted to the response time to a query request from the user. Accordingly, the model inferencing platform is capable of considering significantly greater quantities of historic data and current session data, and can further utilize a significantly increased number of fulfillment intent prediction features 204 in the evaluation, than other systems that are limited based the network and Internet-centric problem of response time. As a result, the model inferencing platform 222 can generate an inferred fulfillment type 230 with significantly greater confidence of accuracy. In some embodiments, an ordered product may be more generically referred as an item to be acquired, and an order may be more generically referred as an intended acquisition and/or acquisition intention.

The asynchronous operation is enabled, at least in part, through the caching of the determined inferred fulfillment type 230. The processing resource 102 can cause the one or more inferred fulfillment types 230 provided by the modeling inference platform 222 to be stored in a cache memory 406. By storing the inferred fulfillment type 230 in a cache memory 406, the prediction platform interface 202 is capable of providing rapid in session responses to inquiries 402 from the applications of user computing devices directly from the cache instead of requiring a triggering of the first trained model. Further, this response directly from the cache 406 can occur without the delay that would be introduced at least by applying the first trained model 224 in response to the user query. When an application and/or user request query 402 is received from a downstream application during a current session, that query can be directed by a service layer 404 to the cache 406. In some embodiments, the prediction platform interface 202 can, for each request for a fulfillment type received during a first interval while a cached inferred fulfillment type is stored in the cache 406 as a most recent interred fulfillment type, access the cache 406 and retrieve the most recently generated inferred fulfillment type 230. In some embodiments, the retrieved inferred fulfillment type 230 is utilized to identify, filter, prioritize, organize and/or otherwise process content that may potentially returned to a requesting user computing device in response to a user submitted request or query (e.g., product search, add-to-cart, key word search, etc.). Further, in some embodiments, the processing resource can communicate the cached inferred fulfillment type, without triggering an additional refresh query to the first trained model, to one or more additional processing systems for use in identifying, filtering, prioritizing, organizing and/or otherwise process content. Additionally or alternatively, the processing resource can control the data communications transceiver 107 to communicate the cached inferred fulfillment type, without triggering an additional refresh query to the first trained model, to the requesting remote user computing device for use by a respective one of one or more application submitting a request for the fulfillment type (e.g., prioritizing, filter, organizing, etc.).

In some embodiments, the operational efficiency of the prediction platform interface 202 and communications control system 100 is further improved by managing the triggering of the first trained model 224. By managing the triggering, the prediction platform interface 202 can reduce computational overhead while still providing accurate predictions. The triggering, in some embodiments, is managed in part based on the predefined interval applied in the feature generation platform 220. In some embodiments, the processing resource 102, in executing the instructions 106, implements a trigger service 410 that can receive input from feature generation platform 220 regarding changes to one or more relevant fulfillment intent prediction features 204. As described above, the feature generation platform 220 performs a reevaluation according to the predefined interval. Accordingly, at least some of the relevant fulfillment intent prediction features associated with a predefined interval are not going to change until an earliest of the expiration of the associated predefined interval. With no expected changes to the relevant fulfillment intent prediction features 204, a triggering of the first trained model 224 based on the same, unchanged relevant fulfillment intent prediction features 204 is expected to produce the same inferred fulfillment type 230 and as such provide no or little benefit. As such, the trigger service 410 or system can limit the triggering 411 of the first trained model 224 at least as a function of the predefined interval. Furthermore, the reevaluation by the feature generation platform 220 of the historic data and/or in-session data often does not result in a change or a threshold change to one or more fulfillment intent prediction features 204. Based on the potential lack of at least a threshold change to one or more relevant fulfillment intent prediction features 204, the trigger service 410 can further limit the triggering of the first trained model 224 until at least a threshold change is determined to at least one, and in some instances, respective threshold changes to a threshold number of the relevant fulfillment intent prediction features 204 before triggering a refresh of the first trained model 224.

The processing resource 102, executing the instructions, to implement the trigger service can repeatedly evaluate, during the current session and according to the predefined interval, whether to trigger a refresh of the inferred fulfillment type 230 as a function of a change to one or more of the fulfillment intent prediction features 204 since a preceding triggered query to the first trained model 224 and/or since a most recent caching of determined inferred fulfillment type 230. For example, the repeated evaluations can repeatedly determine, during the current session and in some instance in response to different trigger actions from applications executed on the remote user computing device, whether there is change to one or more fulfillment intent prediction features 204 relative to the preceding triggered query to the first trained model 224. The feature generation platform 220, in some embodiments, can generate one or more notifications 412 of a change and/or threshold change to one or more of the fulfillment intent prediction features 204, which can be evaluated by the trigger service 410 in the evaluation of whether to trigger a refresh query to the first trained model. In some embodiments, trigger threshold and/or definitions 414 can be maintained by the trigger service or system and/or modified. The refresh of a query to the first train model can thus be triggered 411, in some embodiments, in response to the repeated evaluations and according to the predefined interval, and a subsequent inferred fulfillment type can be identified that the user intends to receive the product ordered during the current session based on the fulfillment intent prediction features using the first trained model.

Further, in some embodiments, an evaluation of whether to trigger the refresh of the inferred fulfillment type can be in response to one or more different trigger actions from one or more applications executed on the remote user computing device 110. As such, the trigger service 410 can trigger 411 the refresh query to the first trained model in response to one or more of these trigger actions, of the different trigger actions from one or more applications, and when there is the change to one or more fulfillment intent prediction features relative to the preceding triggered query to the first trained model. The model inferencing platform 222 can, in some embodiments, include and/or activate a model orchestrator 416 or other functional control to coordinate the initiation of the refresh inquiry to the first trained model 224 in response to the trigger 411. Similarly, the trigger service 410 can prevent a triggering of a potential refresh query to the first trained model 224 in response to an evaluation of whether to trigger the refresh of the inferred fulfillment type confirming a lack of a threshold change to at least a first fulfillment intent prediction feature of the fulfillment intent prediction features 204. Again, preventing the triggering can enables the system to balance accuracy while avoiding excessive computational processing that is not expected to provide improved results or substantive value, thus improving the operational efficiency of the system. The control of the triggering of the first trained model 224 greatly improves the operational efficiency and reduces computation overhead, while still continuously providing highly accurate the inferred fulfillment type 230 from the cache 406.

The processing resource 102, executing the instructions 106, in can further determine, using one or more second trained models 226, a respective predicted confidence level 232 of an accuracy of one or more inferred fulfillment types 230 predicted by the one or more first trained models 224. The determined level or levels of confidence 232 can adjust a level of filtering, used in the processing of potential content to be returned to the user computing device level, applied as a function of the inferred fulfillment type 230 in filtering the set of one or more products to determine the sub-set of products by varying the filtering as a function of the confidence level of accuracy of determined one or more inferred fulfillment types. In some embodiments, for example, the greater the level of confidence of an accuracy of the inferred fulfillment type that stronger the filter applied based on the inferred fulfillment type. Similarly, the lower the confidence, in some implementations, the filter based on the inferred fulfillment type may be reduced. In some embodiments, a determined inferred fulfillment type may be disregarded and instead use a default fulfillment type and/or fall back to an inferred fulfillment type determined earlier in a session with a reduced filtering emphasis. The confidence levels, in some embodiments are utilized based on predefined sets of rules that can dictate the use of the determined one or more inferred fulfillment types and/or how aggressively the one or more inferred fulfillment types are used in processing the content to be provided to the user computing device and the control of the user computing device in rendering the filtered content.

In some embodiments, multiple inferred fulfillment types may be determined, and respective confidence levels can be determined for each of the different inferred fulfillment types and these multiple confidence levels can cooperatively be used and/or a ratio of the confidence levels may be used as a function of the relative importance or priority applied with respect to the multiple determined inferred fulfillment types. The processing resource, in some embodiments, can determine using one or more of the second trained models a predicted second confidence level of an accuracy of a second inferred fulfillment type. Based on the multiple inferred fulfillment types, filtering of the set of one or more products can include the filtering, based on a threshold relationship between the first confidence level of the accuracy of the first inferred fulfillment type and the second confidence level of accuracy of the second inferred fulfillment type, the set of one or more products to obtain the sub-set of one or more products that satisfy the in-session search and comply with both the first inferred fulfillment type and the second inferred fulfillment type as a function of the relationship between the corresponding multiple confidence levels.

The content control platform 240 can, in some embodiments, sort confidences and corresponding determined inferred fulfillment types into groups, such as high confidence, medium confidence and low confidence, and/or other such groupings. Based on which grouping a particular determined inferred fulfillment type is associated, the content control platform 240 can apply different strategies for processing and/or filtering the content in controlling what resulting contents are provided to the user computing device and/or controlling the user computing device in the formatting and organization of the rendering of the content by the user computing device. For example, when a confidence level is high, the filtering may exclude some products and/or content that do not comply with the determined inferred fulfillment type, when the confidence level is medium a priority or boost may be given to those products that comply with the inferred fulfillment type (e.g., causing those products to be displayed higher in a listing of products returned in a search), and/or the use of a fulfillment type may not be factored or a default fulfillment type may be used in filtering (e.g., in prioritizing).

Figure 5:
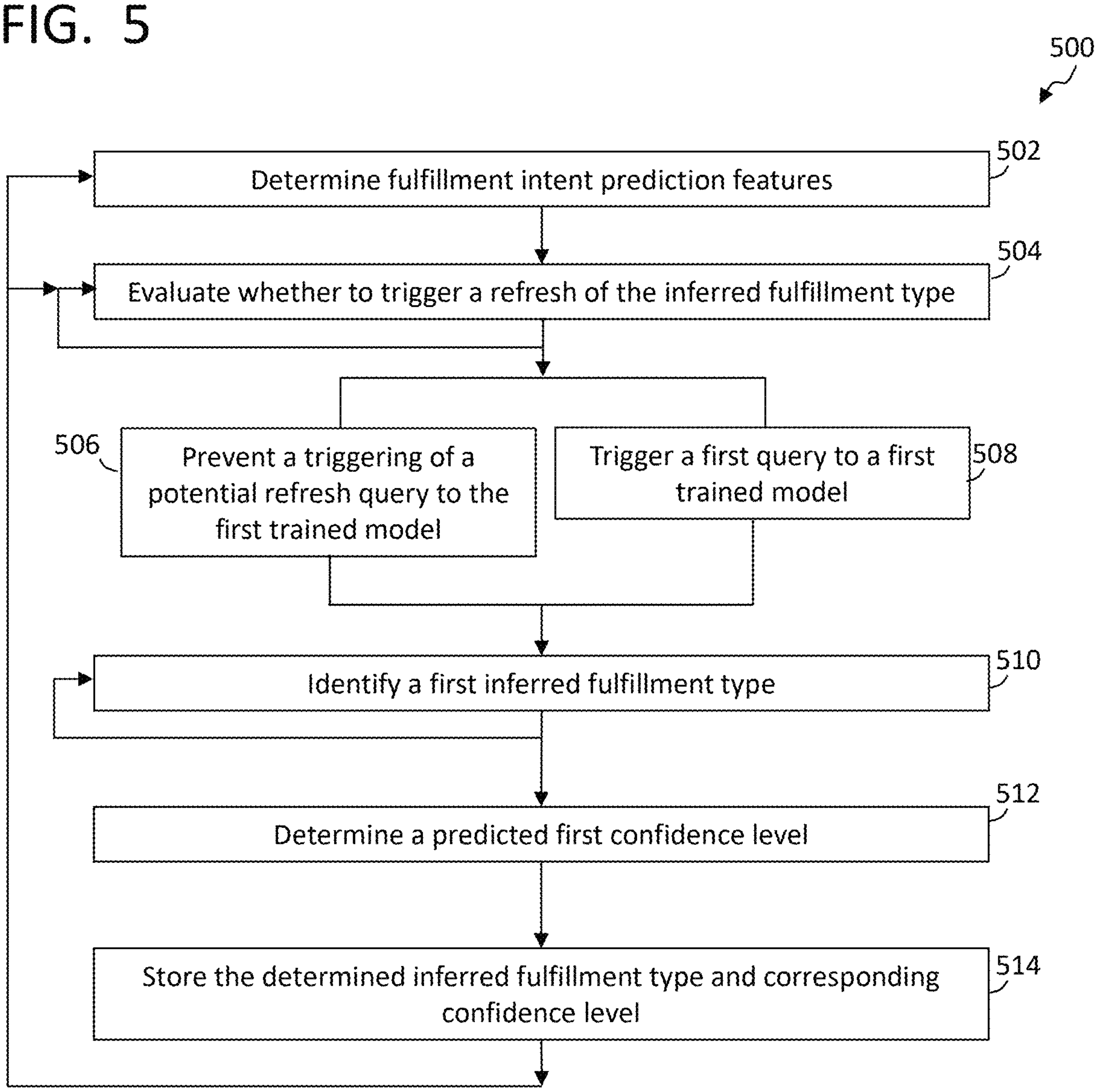
FIG. 5 illustrates a flow diagram of an example process of controlling digital communications between electronic system components over a distributed network, in accordance with some embodiments.

FIG. 5 illustrates a flow diagram of an example process 500 of controlling digital communications between electronic system components over a distributed network, in accordance with some embodiments. The process 500, in some embodiments, is implemented during a current session between a client/user and a prediction platform interface 202 based on communications between a client/user computing device 110 and the prediction platform interface. In some embodiments, the process 500 is initiated after confirming that a user has not specifically designated in the current session a selected intended fulfillment type (e.g., selected as an option through a graphical user interface of the application being utilized to submit one or more queries. In step 502, the processing resource 102, executing instructions stored on the readable medium 104, determines fulfillment intent prediction features based on data received from a database of historic user data and in session data obtained during the current session based on actions executed in the current session. The historic user data can, in some implementations, comprises historic virtual interaction behavior data associated with numerous different users executing respective data retrieval processes including historic searches, historic add to cart actions, historic purchase data associated with the numerous different purchase transactions by users and respective fulfillment type, of a plurality of potential fulfillment types, for each of the numerous different purchase transactions. Step 502 is repeated over time based on one or more predefined intervals of time with one or more and typically all of the fulfillment intent prediction features repeatedly determined, during the current session, at each repetition of the predefined interval. The repeated determination of the one or more fulfillment intent prediction features, in some embodiments, is based on the intervals and is typically independent of requests for a fulfillment type. In other embodiments, such as in response to an initial establishment of the current session and/or based on a predefined threshold period of time between one or more actions, one or more events (e.g., the initiation of the session) can trigger the determination of the fulfillment intent prediction features.

In step 504, the processing resource can evaluate upon an initial activation of the session and repeatedly evaluate, during the current session and according to the predefined interval, whether to trigger a refresh of the inferred fulfillment type 230 as a function of a change to one or more of the fulfillment intent prediction features since an immediately preceding triggered query to the first trained model (or when an inferred fulfillment type is yet to be determined). This determination greatly improves the response time to allow the system to provide highly accurate predictions within the extremely short available time to respond to networked and Internet queries, while further significantly improving operational efficiency and reducing computational overhead enabling computational resource usage. This is particularly important because such data sources typically implement thousands to hundreds of thousands of sessions at any given time, such as with a shopping data source hundreds of thousands of customers may be accessing a shopping retailer website at any given time. The repeated reevaluation in step 504 can be repeated in response to a change or threshold change to one or more of the fulfillment intent prediction features, which are refreshed based the predefined interval. Additionally or alternatively, in some embodiments, step 504 can be repeatedly executed over time during the session as a function of the predefined interval, in response to one or more notifications 412 of a change or threshold change to one or more of or a threshold number of the fulfillment intent prediction features, in response to an action trigger initiated from an application executed at the user computing device 110, and/or other such triggers. Typically, however, the reevaluation in step 504 can be repeated in response to a change or threshold change to one or more of the fulfillment intent prediction features.

In step 506, the triggering of potential refresh query to one or more first trained models 224 can be prevented in response to the first evaluation confirming a lack of change or a threshold change to at least one fulfillment intent prediction feature of the fulfillment intent prediction features. In step 508, the processing resource during the session can trigger a first query to at least a first trained model 224 to determine and/or generate one or more inferred fulfillment types. The model query to the first trained model can include the fulfillment intent prediction features 204, which in some embodiments comprises the actual fulfillment intent prediction features, an identification of where the current fulfillment intent prediction features are stored, a link to access the fulfillment intent prediction features, an authorization to access the fulfillment intent prediction features and/or other such triggers such that the first trained model utilizes a most current set of the fulfillment intent prediction features. In step 510, one or more inferred fulfillment types 230 can be identified based on the execution of the first trained model 224 by which the user is predicted to intend to receive an item intended to be acquired (e.g., ordered) during the current session based on the fulfillment intent prediction features 204. Step 510 can be repeated during the session as described above and further below to continue to utilize real time data received during the current session to provide a more accurate prediction of the inferred fulfillment type over the session.

Some embodiments include step 512 where the processing resource 102, while executing the instructions 106, determines, using one or more second trained models 226, a predicted confidence level 232 of an accuracy of the one or more inferred fulfillment types determined in step 510. In step 514, the one or more inferred fulfillment types determined, and in some embodiments the corresponding determined confidence level 232 can be stored in a cache memory. As described above and further below, the process 500 can repeatedly implement steps 502 and 504 to repeatedly evaluate, during the current session, according to the predefined interval whether to trigger a refresh of the inferred fulfillment type as a function of a change to one or more of the fulfillment intent prediction features since a preceding triggered query to the first trained model. As a result the process can generate a subsequent or second inferred fulfillment type in response to determining during the session that a refresh of the inferred fulfillment type is to be initiated. The repeated evaluation of whether to trigger the refresh of the inferred fulfillment type can comprises repeatedly implementing step 504 in determining, during the current session and in some implementations in response to different trigger actions from applications executed on the remote user computing device, whether there is change to a one or more of the fulfillment intent prediction features, of the fulfillment intent prediction features, relative to the preceding triggered query to the first trained model 224. The evaluation can repeat steps 508 and 510 to trigger, in response to the repeated evaluations, a refresh query to the one or more first trained models 224 and according to the predefined interval to generate one or more inferred fulfillment types, and in some embodiments re-initiate step 512 subsequently triggering a query to the second trained model to generate corresponding one or more confidence levels. In some embodiments, the triggering of the refresh model query to the first trained model can at least in part be in response to a first trigger action, of the different trigger actions, from the user computing device 110 and when there is the change to the first fulfillment intent prediction feature relative to the preceding triggered query to the first trained model. In response to initiating the refresh of the inferred fulfillment type in steps 508 and 510, a subsequent or second inferred fulfillment type, of the plurality of potential fulfillment types, is identified that the user intends to receive the product ordered during the current session based on the fulfillment intent prediction features.

Figure 6:
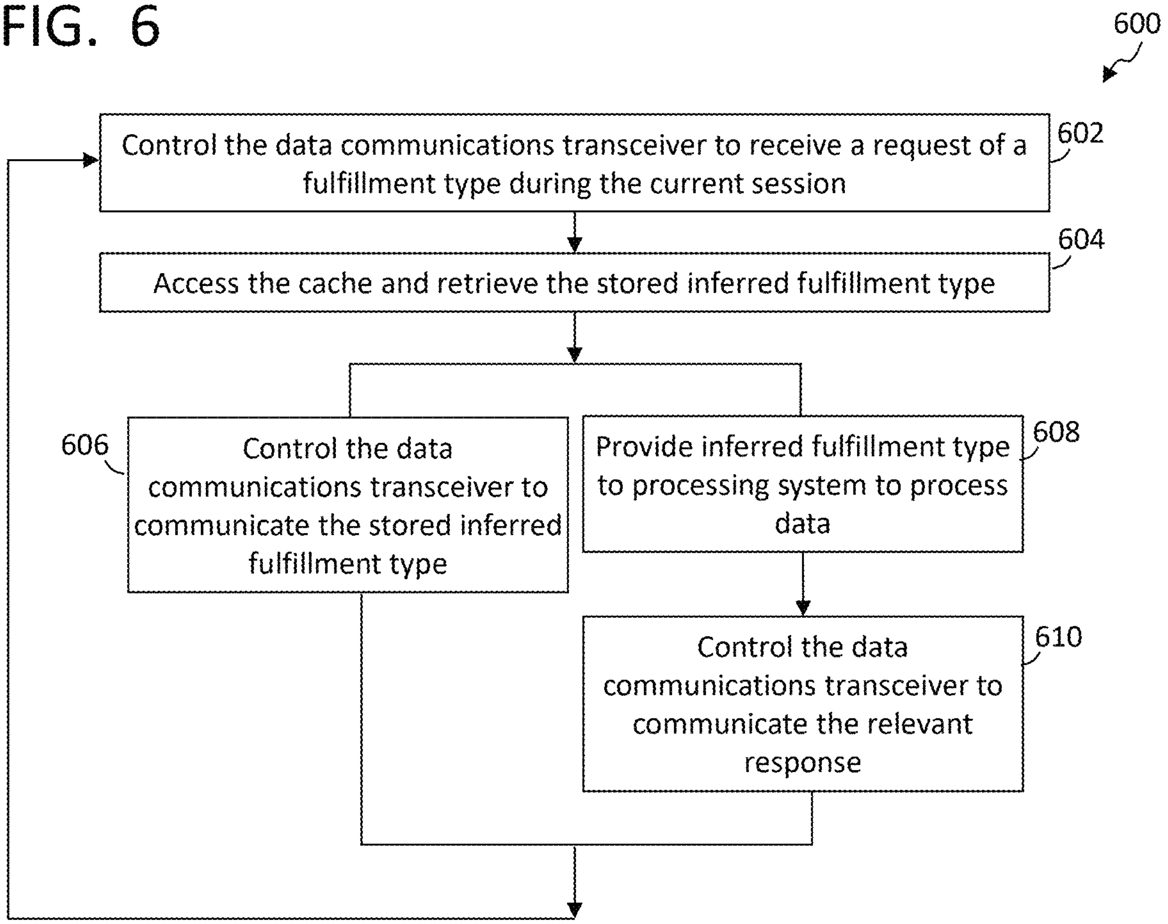
FIG. 6 illustrates a flow diagram of an example process of distributing one or more inferred fulfillment types to requesting downstream applications executed through user computing devices, in accordance with some embodiments.

FIG. 6 illustrates a flow diagram of an example process 600 of distributing one or more inferred fulfillment types to requesting downstream applications executed through user computing devices 110, in accordance with some embodiments. In step 602, the processing resource 102, executing the instructions 106, can control the data communications transceiver 107 to receive (e.g., upon initiation of a current session, during the current session and subsequent to an identification of an inferred fulfillment type 230, etc.) a request of a fulfillment type from a data query application executed on the remote user computing device 110. In step 604, the processing resource, without triggering an additional refresh query to the first trained model, accesses and/or directs access to the cache memory 406 and retrieves or enable retrieval of a current one or more inferred fulfillment types. As such, in some embodiments, for each request for a fulfillment type that is received during a current or first predefined interval and while a specific inferred fulfillment type is stored in the cache as a most recent interred fulfillment type, internal and/or external requests for an inferred fulfillment type are directed to the cache 406, and the current one or more inferred fulfillment types can be retrieved directly from the cache 406 without having to reinitiate the first trained model.

Some embodiments include step 606 where the data communications transceiver 107 is controlled to communicate the current inferred fulfillment type obtained from the cache, without triggering an additional refresh query to the first trained model, to the remote user computing device 110 for use by a respective one of one or more application submitting a request for the fulfillment type. Additionally or alternatively, some embodiments include step 608 to provide the current inferred fulfillment type obtained from the cache, without triggering an additional refresh query to the first trained model, to a processing system to be utilized in identifying, organizing and/or otherwise processing relevant data as a function of the inferred fulfillment time. Further, some embodiments include optional step 610 where the processing resource, in executing the instructions 106, can control the data communications transceiver 107 to communicate, via the distributed communications network, response data in a predefined standard format consistent with the prediction platform interface in controlling the remote user computing device 110 to render content comprising the sub-set of one or more products at a prominent results position within the rendered content consistent with a predefined layout of the prediction platform interface.

Figure 7:
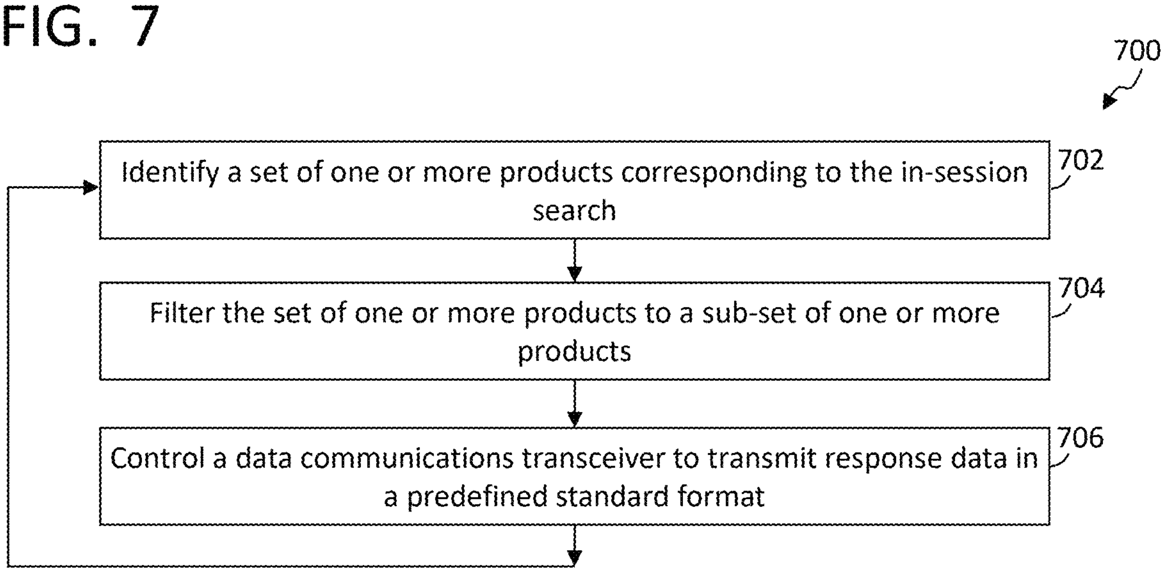
FIG. 7 illustrates a flow diagram of an example process of controlling the distribution and access to data for use by a user computing system, in accordance with some embodiments.

FIG. 7 illustrates a flow diagram of an example process 700 of controlling the distribution and access to data for use by a user computing devices 110, in accordance with some embodiments. In step 702, the processing resource 102 and/or a separate processing resource can identify, based on an in-session search received from the user computing system and/or an internal system, a set of one or more products corresponding to the in-session search. This search may be based on a product search, a key word search, a selection of a product page, an add to cart action, other actions, or a combination of such actions and/or search triggers. In step 704, the identified set of one or more products can be filtered at least in part based on the inferred fulfillment type to a sub-set of one or more products that satisfy the in-session search and comply with the second inferred fulfillment type. For example, the search results may filter a set of identified products to at least prioritize a sub-set of those products that match the search criteria and further are available consistent with the inferred fulfillment type such that prioritized sub-set of products at least is presented through the graphical user interface of the user computing device in a priority location and/or at a top most portion of a returned listing of products. In some embodiments, the filtering of the set of one or more products may include a filtering by varying the filtering as a function of a first confidence level of accuracy of the first inferred fulfillment type. In some embodiments, the filtering of the set of one or more products can comprises filtering the set of one or more products, based on a threshold relationship between a first confidence level of accuracy of a first inferred fulfillment type and a second confidence level of accuracy of a second inferred fulfillment type, to the sub-set of one or more products that satisfy the in-session search and comply with both the first inferred fulfillment type and the second inferred fulfillment type as a function of the respective confidence levels. For example, a first sub-set of products may be specified as a highest priority that satisfy both the first inferred fulfillment type and the second inferred fulfillment type, a second sub-set given a second priority that satisfy the first inferred fulfillment type when the first confidence value of the first fulfillment type is greater than the second confidence value of the second inferred fulfillment type, a third sub-set of product having a third priority that satisfy the second inferred fulfillment type but not the first fulfillment type, and a fourth sub-set of products that do not satisfy the first or second inferred fulfillment type. As such, one of the inferred fulfillment types may be given an effective boost over another inferred fulfillment type as a function of the determined confidence level.

In some embodiments, the process 700 includes step 706 wherein the processing resource 102, executing the instructions 106, can control the data communications transceiver 107 to transmit to the remote user computing device, via the distributed communications network, response data in a predefined standard format consistent with the prediction platform interface in controlling the remote user computing device to render content comprising the sub-set of one or more products at a prominent results position within the rendered content consistent with a predefined layout of the prediction platform interface. This can provide data that complies with the determined one or more inferred fulfillment types, while optimizing the processing resources in part through the utilization of one or more cached inferred fulfillment types.

Figure 8:
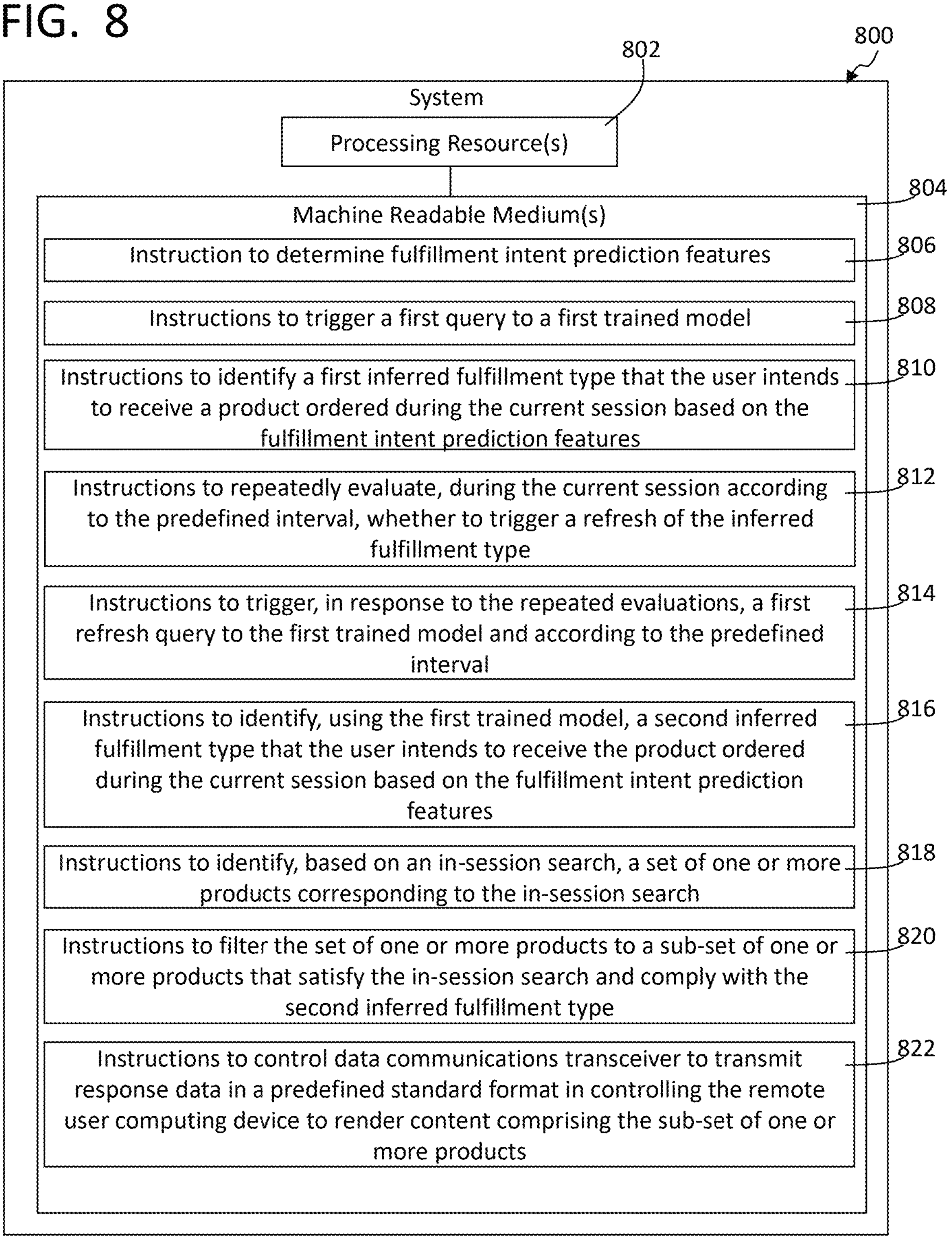
FIG. 8 depicts example system that includes one or more non-transitory, machine readable media encoded with example instructions executable by one or more processing resources, in accordance with some embodiments.

FIG. 8 depicts example system 800 that includes one or more non-transitory, machine readable media 804 encoded with example instructions executable by one or more processing resources 802, in accordance with some embodiments. In some embodiments, the system 800 may be useful for implementing aspects of the communications control system 100 and/or the one or more processing resources 102, and/or in performing some or all aspects of the processes 500, 600 and/or 700 of FIGS. 5-7, respectively. For example, the instructions encoded on machine readable media 804 may be included in instructions 106. In some implementations, functionality described with respect to FIGS. 1-4 may be included in the instructions encoded on machine readable media 804.

The one or more processing resources 802 may include a microcontroller, a microprocessor, central processing unit core(s), an ASIC, an FPGA, and/or other hardware device suitable for retrieval and/or execution of instructions from the machine readable media 804 to perform functions related to various examples. Additionally or alternatively, the processing resources 802 may include or be coupled to electronic circuitry or dedicated logic for performing some or all of the functionality of the instructions described herein.

The machine readable media 804 may be any medium suitable for storing executable instructions, such as RAM, ROM, EEPROM, flash memory, a hard disk drive, an optical disc, or the like. In some example implementations, the machine readable media 804 may be a tangible, non-transitory medium. The machine readable media 804 may be disposed within the system 800, in which case the executable instructions may be deemed installed or embedded on the system. Additionally or alternatively, some or all of the machine readable media 804 may be one or more remote, external to and/or portable storage medium, and may be part of an installation package.

As described further herein, the machine readable media 804 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIG. 8.

With reference to FIG. 8, the machine readable media 804 includes instructions 806, 808, 810, 812, 814, 816, 818, 820, 822. Further, in some embodiments, the instructions are executed during a current session with a user computing device 110. Instructions 806, when executed, cause the processing resource 802 to determine, by the processing resource executing instructions stored on a readable medium, fulfillment intent prediction features based on data received from a database of historic user data and in session data obtained during the current session based on actions executed in the current session, wherein the historic user data comprises historic virtual interaction behavior data associated with numerous different users executing respective data retrieval processes including historic searches, historic add to cart actions, historic purchase data associated with the numerous different purchase transactions by users and respective fulfillment type, of a plurality of potential fulfillment types, for each of the numerous different purchase transactions.

Instructions 808, when executed, cause the processing resource 802 to trigger a first query to a first trained model, the query including the fulfillment intent prediction features. Instructions 810, when executed, cause the processing resource 802 to identify, by the processing resource using the first trained model, a first inferred fulfillment type, of the plurality of potential fulfillment types, that the user intends to receive a product ordered during the current session based on the fulfillment intent prediction features. Instructions 812, when executed, cause the processing resource 802 to repeatedly evaluate, by the processing resource during the current session, according to the predefined interval whether to trigger a refresh of the inferred fulfillment type as a function of a change to one or more of the fulfillment intent prediction features since a preceding triggered query to the first trained model.

Instructions 814, when executed, cause the processing resource 802 to trigger, in response to the repeated evaluations, a first refresh query to the first trained model and according to the predefined interval. Instructions 816, when executed, cause the processing resource 802 to identify, using the first trained model, a second inferred fulfillment type, of the plurality of potential fulfillment types, that the user intends to receive the product ordered during the current session based on the fulfillment intent prediction features. Instructions 818, when executed, cause the processing resource 802 to identify, based on an in-session search, a set of one or more products corresponding to the in-session search. Instructions 820, when executed, cause the processing resource 802 to filter the set of one or more products to a sub-set of one or more products that satisfy the in-session search and comply with the second inferred fulfillment type. Instructions 822, when executed, cause the processing resource 802 to control data communications transceiver to transmit to the remote user computing device, via the distributed communications network, response data in a predefined standard format consistent with the prediction platform interface in controlling the remote user computing device to render content comprising the sub-set of one or more products at a prominent results position within the rendered content consistent with a predefined layout of the prediction platform interface.

Figure 9:
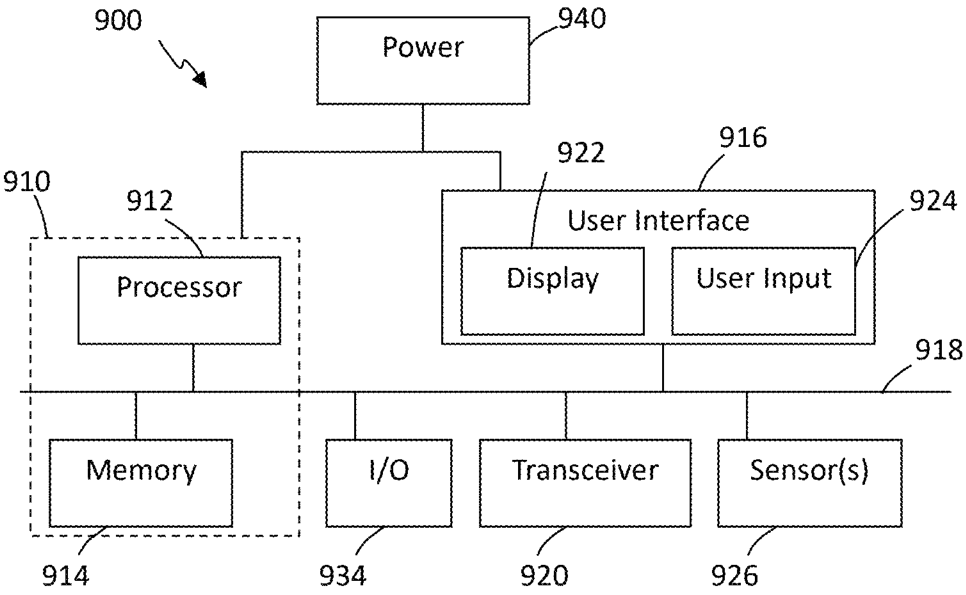
FIG. 9 illustrates an example system for use in implementing methods, techniques, devices, apparatuses, systems, servers, sources and providing control of digital communications in controlling user computing devices and the allocation of relevant content, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an example system 900 that may be used for implementing any of the components, processing resources, circuits, circuitry, systems, functionality, logic, apparatuses, processes, and/or devices of the communications control system 100, prediction platform interface 202, user computing devices 110, and/or other above or below mentioned systems or devices, or parts of such circuits, circuitry, functionality, systems, apparatuses, processes, or devices. However, the use of the system 900 or any portion thereof is certainly not required.

By way of example, the system 900 may comprise one or more processor resources 912 (sometimes referred to as control circuits), one or more memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network 101 (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include and/or be in communication via the network 101 with one or more sensors 926 to provide information to the system and/or sensor information that is communicated to another component, such as the processing resource 102, delivery vehicles, inventory systems, etc. The sensors can include substantially any relevant sensor, such as optical-based scanning sensors to sense and read optical patterns (e.g., bar codes), radio frequency identification (RFID) tag reader sensors capable of reading RFID tags in proximity to the sensor, distance measurement sensors (e.g., optical units, sound/ultrasound units, etc.), GPS sensor, accelerometer, light sensor, image capture system and image processing, and/or other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor-readable and/or computer-readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 101. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

In some embodiments, prediction platform interface 202 and/or communication control system can be implemented as an asynchronous system that can continuously run in the background, versus other previous system that are activated in response to a requests. Because the previous system responded to a request, the available time to respond and resulting latency on the website impose extreme limitations on at least the complexity of models used and the type and/or number of features that could be used in evaluating fulfillment methods was limited. As such, the present embodiments can implement more complex modeling while using more features, which can include features that provide greater insight but could not be used in previous systems. This results in greater accuracy while reducing latency. The present embodiments additionally utilized the asynchronous implement to repeatedly update the features without increasing or adversely affecting the response time and/or latency. Still further, some present embodiments employ the asynchronous application of models to enable applying more complex machine learning models and/or additional models that could not be utilized in previous systems. Furthermore, some embodiments improve the response time while still providing the more accurate inferred fulfillment type in part through the caching of the determined inferred fulfillment type.

Users often choose to employ a mixture of multiple different fulfillment options in receiving products, and their intended method of receiving products can change over time and even during a single session for different products. This dynamic nature of users' fulfillment choices at the time of and/or during a current session, combined with the ever-changing demand/preference in general, makes it difficult but necessary for content providers, including information provider entities, news provider entities, retail entities, entertainment entities, and/or other such entities to understand users' currently intended fulfillment methods. Previous systems were often limited to setting a default fulfillment filter using a selected fulfillment method in a previous session, or basic aggregated statistics from past selections. These approaches are no longer effective and fail to provide accurate results. Further, the inherent nature of requested content through applications over network requests, such as via the Internet, greatly restricts the time that is available to a processing system to effectively predict an intended fulfillment method with a threshold degree of accuracy. Similarly, because of varying user patterns the accuracy of previous systems is ineffective. To accurately predict users' preferred fulfillment method, some embodiments utilize one or more sets of one or more machine learning model leveraging previous fulfillment method choices, inter-purchase intervals across different fulfillment options, in-session signals, including browsing patterns, search queries, and cart context, and/or other relevant data. The models, using the fulfillment intent prediction features determined according to the one or more predefined intervals, predict an inferred fulfillment type the user is interested in using for the current session among the multiple fulfillment methods. The present embodiments provide significant improvements in the accuracy of predicting fulfillment types compared to traditional methods such as simple aggregation or last session selection.

Some embodiments can use nudges based on the determined inferred fulfillment type prediction to identify content more relevant to the user's current intent. One non-limiting example can include offering users help to build a single fulfillment cart that includes products the user wants to receive by the determined inferred fulfillment type. One or more other single fulfillment carts may similarly be generated during the session based on a determined change in an intended fulfillment type for one or more other products. The single fulfillment cart can in part improve user checkout experience while enhancing a user experience by being presented with content and/or products that correspond to a current intended fulfillment type.

Some embodiments generate fulfillment intent prediction features based on one or more predefined intervals using historic and current in-session data. Examples of features can include customer historical preferences and patterns for different fulfillment options, inter-purchase intervals across different fulfillment options, current and/or historic cart context, user in session activities (e.g., Item Views, add-to-cart(ATC), etc.), item features (e.g., FC (Food & Consumable), GM (General Merchandise)), fulfillment option chosen for the transaction on the same day following feature generation, other such features, or two or more of such features. These features can be used by a set of one or more first trained models. One or more of the first trained models can be implemented through, for example, feed forward neural network, that in some embodiments can determine a user's fulfillment preference probability of each of multiple different fulfillment types (e.g., 3 fulfillment options: Delivery, Pickup, Shipping). The probability can be determined in response to an initiation of a session, and can be updated over time during the current session based at least in part on continued interacts by the user in executing one or more applications to engage one or more content sources (e.g., a product search from a retailer). Further, some embodiments use a set of one or more confidence prediction models, which in some instances may leverage logistic regression using output of feed forward neural network and cart context to generate confidence for the inferred fulfillment type prediction.

The systems and methods can improve on previous systems that relied on heuristics/historical fulfillment data. The present embodiment can use in-session customer signals and machine learning approach to provide real-time insights into user predicted intentions and/or preferences. The system further enables updating to adapt to the dynamic nature of in-session user interactions, enhancing personalization during the current session, and in some embodiments future sessions. The present embodiments predict fulfillment types for new users and/or users with no historical interaction data, providing an accurate prediction based solely on their current session activity thus helping serve most users. Some embodiments can personalize for individual user experiences at different stages, reducing friction and ensuring accurate fulfillment predictions. Some embodiments generate one or more confidence scores for each prediction, enabling implementation of different strategies based on the confidence level of the fulfillment intent prediction. The predictions can also be used to improve search and browsing experiences, helping users receive items based on their preferred fulfillment method, thus streamlining the overall experience.

Some present embodiments implement in part historical fulfillment prediction that does not consider in-session user behaviors and/or interactions, but is modeled on historical interaction behavior of the user. One or more trained machine learning historic evaluation models can be applied to obtain historical intent predictions. For example, historic intent predictions may be obtained consistent to that described in U.S. Patent Application Publication No. 2023/0245215, entitled "Systems and Methods for Generating a Fulfillment Intent Determination for an Event," which is incorporated herein by reference in its entirety.

Some embodiments use the historical intent predictions as input features during in-session real time inferencing which can include applying a set of one or more real time, in-session trained inferencing machine learning models and/or algorithm. Previous systems were incapable of applying complex machine learning models based in part on the real time latency constraint of responding to session queries.

Some present embodiments apply a set of one or more complex trained models to get one or more historical intent predictions. One or more of the historical intent predictions can then become input features during real time, in-session inference. Further, the present embodiments can implement inferencing asynchronously and near real time, the present environments are not subject to the same level of latency constraint as previous systems. The model inferencing platform 222 capitalizes on the asynchronous application to utilize complex models during serving time to be used for inferencing. This further improves the accuracy of fulfillment type predictions while maintaining the latency and efficiency issues.

Still further, some embodiments provide additional optimization in terms of model inferencing at least in part by: a control of the triggering of the model inference and data ingestion by flexible and, in some implementations, user defined actions; and caching the real time predictions for faster retrieval of predictions. The control of the triggering, through the trigger service 410, of the model inference and data ingestion improves computational efficiency without losing accuracy (e.g., the system can set model inferencing to be triggered by one or more predefined actions (e.g., new item page view from a given user). The model inferencing platform can be operated to update the inferred fulfillment type prediction over time during the current session. This updating can be initiated in response to a detected change or threshold change of one or more fulfillment intent prediction features, in some instances in response to one or more actions from the user (e.g., when there is a new item page view from the user), and/or other instances. Additionally, this updating can be implemented asynchronously without the limits of responding to a request and the latency limits imposed to achieve a reasonable response time. The utilization of the caching of the inferred fulfillment type enables faster retrieval of predictions which is unavailable in previous systems, while still providing accurate near real time responses that are predicted to be more accurate than previous systems in part base on the enhanced evaluation provided through the asynchronous processing and machine learning model utilization.

The systems, in some embodiments, provide feature management through the feature generation platform 220, which can comply with standardizes feature definitions, enabling a unified feature schema that simplifies the retrieval and access of fulfillment intent prediction features. The feature generation platform can further, in some embodiments, supports version control, feature reuse, and feature validation, which collectively enhances the efficiency of model inference and development. Still further, the feature generation platform can provide hybrid access to features by providing an online medium 308 or store offers fast access to generated fulfillment intent prediction features, which can provide efficient inference that deliver near real-time experience to users, and an offline cache 310 that provides an ability to retrieve data in large volume for model training, retraining and tuning. Some embodiments efficiently transfer data between online and offline store. The feature generation platform 220, in some implementations, provides a streaming processing framework that make it possible to compute complex fulfillment intent prediction features that could not be generated or utilized in previous systems. The asynchronous application of the models enables the system to quickly iterate through multiple fulfillment intent prediction features and run more accurate and complex inferencing, and repeatedly updating in real-time.

The machine learning models can be implemented through one or more machine learning models and/or generative artificial intelligence (AI). Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. These machine learning models and/or AI can be trained and retrained over time with one or more corpora of information and/or feedback. The corpora of information can include historic data, including the historic data described above, and in-session data acquired in real time and/or maintained over time based on numerous different sessions with numerous different users over time. Still further, some embodiments utilize artificially generated training and/or re-training data. Such data can be generated to simulate one or more data queries, user interactions, action triggers, conditions, other such information or a combination of two or more of such information. Further, the model training system, in some implementations, continues to acquire data and/or feedback over time to be incorporated into the model training data and used to repeatedly re-train one or more models over time to improve the effectiveness and/or accuracy of the machine learning algorithm models. Such information and/or feedback can include subsequent customer purchase information, subsequent changes in customer behaviors information, control commands executed to modify the operation of the retail system, changes in inventory, changes in sales, and/or other such information. Still further, some embodiments utilize artificially generated training and/or re-training data. Such data can be generated to simulate one or more conditions (e.g., error conditions, boundary and/or threshold conditions, desired changes in user behavior, undesirable user behaviors, other such conditions, or a combination of two or more of such information). The training data can be dependent on the type of machine learning model or models employed. The machine learning models and/or modeling applications further include the trained, deep learning models that process the data. The learning models can be substantially any relevant modeling, whether custom developed or acquired by a third party. For example, in some embodiments, the trained learning models may include, but are not limited to, one or more neural network machine learning models, one or more convolutional neural networks, one or more deep convolutional and recurrent neural networks, one or more Bayesian models, one or more Markov chain models, one or more feed forward neural networks, decision trees, XGBOOST, GRIDSEARCHCV, unsupervised learning, regression, clustering, TENSORFLOWLITE model, MOBILENETV2 model, ML KIT for FIREBASE, and substantially any other relevant modeling and supporting applications (e.g., CORE ML, VISION FRAMEWORK, CAFFE, KERAS, XGBOOST, TENSORFLOW, etc.) or combination of two or more of such machine learning models and/or algorithms to implement the modeling. Additionally or alternatively, the machine learning models can comprise dynamically learned behavior based on, for example, decision tree learning, association rule learning, inductive logic learning, support vector learning, cluster analysis learning, Bayesian network learning, and/or similarity and metric learning, and/or other such modeling.

The machine learning models may be trained on a schedule, on a daily basis, in response to triggers and/or other such factors in updating the models with the information and/or transactions that occurred over time. The machine learning models can be trained using historical transactions, previous fulfillment types of items, and consideration intent for items, previous in-session information, simulated information, other such information, or a combination of different types of information as described above and further below. When a user submits a query to search for items during a session event (e.g., a shopping session), the system in some embodiments can control the acquisition of content, the communication of content and/or control a user computing device in controlling the presentation, rending, and/or order of content (e.g., the items) returned to, for example, provide prioritization of items based on the respective fulfillment type(s) of those items and the relationship between the one or more inferred fulfillment types and the corresponding confidence levels.

Some embodiments provide systems to control digital communications between electronic system components over a distributed network, the system comprising: a data communications transceiver communicatively coupled with a distributed communications network; a processing resource communicatively coupled with the data communications transceiver; and a machine readable medium storing instructions that, when executed by the processing resource, cause the processing resource to: during a current session between a client and a prediction platform interface, determine acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with the numerous different item acquisition transactions by clients and respective acquisition execution type, of a plurality of potential acquisition execution types, for each of numerous different item acquisition transactions; trigger a query to a first trained model, the query including the acquisition execution intent prediction features; identify, using the first trained model, a first inferred acquisition execution type, of the plurality of potential acquisition execution types, that the client intends to receive an item to be acquired during the current session based on the acquisition execution intent prediction features; repeatedly evaluate, during the current session, according to a predefined interval whether to trigger a refresh of the first inferred acquisition execution type as a function of a change to one or more of the acquisition execution intent prediction features since a preceding triggered query to the first trained model; trigger, in response to the repeated evaluations, a first refresh query to the first trained model and according to the predefined interval; identify, using the first trained model, a second inferred acquisition execution type, of the plurality of potential acquisition execution types, that the client intends to receive the item to be acquired during the current session based on the acquisition execution intent prediction features; identify, based on an in-session search, a set of one or more items corresponding to the in-session search; filter the set of one or more items to a sub-set of one or more items that satisfy the in-session search and comply with the second inferred acquisition execution type; and control the data communications transceiver to transmit to a remote client computing device, via the distributed communications network, response data in a predefined standard format consistent with the prediction platform interface in controlling the remote client computing device to render content comprising the sub-set of one or more items at a prominent results position within the rendered content consistent with a predefined layout of the prediction platform interface.

The processing resource, in some embodiments, in executing the instructions can store the second inferred acquisition execution type in a cache memory; control the data communications transceiver to receive, during the current session and subsequent to the identification of the second inferred acquisition execution type, a request of an acquisition execution type from a data query application executed on the remote client computing device; and access, without triggering an additional refresh query to the first trained model, the cache memory and retrieve the second inferred acquisition execution type, and control the data communications transceiver to communicate the second inferred acquisition execution type to the remote client computing device for use by the data query application. In some embodiments, the determining, by the processing resource, the acquisition execution intent prediction features comprises repeatedly determining, during the current session, the acquisition execution intent prediction features at each repetition of the predefined interval independent of requests for an acquisition execution type. In some embodiments, the repeatedly evaluating whether to trigger the refresh of the first inferred acquisition execution type comprises repeatedly determining, during the current session and in response to different trigger actions from applications executed on the remote client computing device, whether there is a change to a first acquisition execution intent prediction feature, of the acquisition execution intent prediction features, relative to the preceding triggered query to the first trained model; and wherein the triggering the first refresh query comprises triggering the first refresh query to the first trained model in response to a first trigger action, of the different trigger actions, and when there is the change to the first acquisition execution intent prediction feature relative to the preceding triggered query to the first trained model.

The instructions when executed, in some embodiments, cause the processing resource to further prevent a triggering of a potential refresh query to the first trained model in response to a first evaluation confirming a lack of a threshold change to a first acquisition execution intent prediction feature of the acquisition execution intent prediction features. In some implementations, the instructions, when executed, cause the processing resource to: for each request for an acquisition execution type, received during a first interval while the second inferred acquisition execution type is stored in the cache memory as a most recent interred acquisition execution type, accessing the cache memory and retrieving the second inferred acquisition execution type, and controlling the data communications transceiver to communicate the second inferred acquisition execution type, without triggering an additional refresh query to the first trained model, to the remote client computing device for use by a respective one of one or more application submitting a request for the acquisition execution type. In some embodiments, the instructions when executed by the processing resource cause the processing resource to: determine, using a second trained model, a predicted first confidence level of an accuracy of the first inferred acquisition execution type; and filter the set of one or more items by varying the filtering as a function of the first confidence level of accuracy of the first inferred acquisition execution type. Further, in some implementations, the instructions when executed by the processing resource cause the processing resource to: determine using the second trained model a predicted second confidence level of an accuracy of a second inferred acquisition execution type; and filtering of the set of one or more items by filtering, based on a threshold relationship between the first confidence level of the accuracy of the first inferred acquisition execution type and the second confidence level of accuracy of the second inferred acquisition execution type, the set of one or more items to the sub-set of one or more items that satisfy the in-session search and comply with both the first inferred acquisition execution type and the second inferred acquisition execution type.

Some embodiments provide methods of controlling digital communications between electronic system components over a distributed network, the method comprising: during a current session between a client and a prediction platform interface, determining, by a processing resource executing instructions stored on a readable medium, acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with numerous different item acquisition transactions by clients and respective acquisition execution type, of a plurality of potential acquisition execution types, for each of the numerous different item acquisition transactions; triggering a query to a first trained model, the query including the acquisition execution intent prediction features; identifying, by the processing resource using the first trained model, a first inferred acquisition execution type, of the plurality of potential acquisition execution types, that the client intends to receive an item to be acquired during the current session based on the acquisition execution intent prediction features; repeatedly evaluating, by the processing resource during the current session, according to a predefined interval whether to trigger a refresh of the first inferred acquisition execution type as a function of a change to one or more of the acquisition execution intent prediction features since a preceding triggered query to the first trained model; triggering, in response to the repeated evaluations, a first refresh query to the first trained model and according to the predefined interval; identifying, using the first trained model, a second inferred acquisition execution type, of the plurality of potential acquisition execution types, that the client intends to receive the item to be acquired during the current session based on the acquisition execution intent prediction features; identifying, based on an in-session search, a set of one or more items corresponding to the in-session search; filtering the set of one or more items to a sub-set of one or more items that satisfy the in-session search and comply with the second inferred acquisition execution type; and controlling data communications transceiver to transmit to a remote client computing device, via a distributed communications network, response data in a predefined standard format consistent with the prediction platform interface in controlling the remote client computing device to render content comprising the sub-set of one or more items at a prominent results position within the rendered content consistent with a predefined layout of the prediction platform interface. Some embodiments further comprise: storing the second inferred acquisition execution type in a cache memory; controlling the data communications transceiver to receive, during the current session and subsequent to the identification of the second inferred acquisition execution type, a request of an acquisition execution type from a data query application executed on the remote client computing device; and accessing, without triggering an additional refresh query to the first trained model, the cache memory and retrieving the second inferred acquisition execution type, and controlling the data communications transceiver to communicate the second inferred acquisition execution type to the remote client computing device for use by the data query application. The determining the acquisition execution intent prediction features, in some implementations, comprises repeatedly determining, during the current session, the acquisition execution intent prediction features at each repetition of the predefined interval independent of requests for an acquisition execution type.

In some embodiments, the repeatedly evaluating whether to trigger the refresh of the first inferred acquisition execution type can comprises repeatedly determining, during the current session and in response to different trigger actions from applications executed on the remote client computing device, whether there is a change to a first acquisition execution intent prediction feature, of the acquisition execution intent prediction features, relative to the preceding triggered query to the first trained model; and wherein the triggering the first refresh query comprises triggering the first refresh query to the first trained model in response to a first trigger action, of the different trigger actions, and when there is the change to the first acquisition execution intent prediction feature relative to the preceding triggered query to the first trained model. Some embodiments further comprise: preventing, by the processing resource, a triggering of a potential refresh query to the first trained model in response to a first evaluation confirming a lack of a threshold change to a first acquisition execution intent prediction feature of the acquisition execution intent prediction features. Further, some embodiments comprise: accessing, for each request for an acquisition execution type, received during a first interval while the second inferred acquisition execution type is stored in the cache memory as a most recent interred acquisition execution type, the cache memory and retrieving the second inferred acquisition execution type, and controlling the data communications transceiver to communicate the second inferred acquisition execution type, without triggering an additional refresh query to the first trained model, to the remote client computing device for use by a respective one of one or more application submitting a request for the acquisition execution type. Some embodiments comprise determining, by the processing resource using a second trained model, a predicted first confidence level of an accuracy of the first inferred acquisition execution type; and wherein the filtering the set of one or more items by varying the filtering as a function of the first confidence level of accuracy of the first inferred acquisition execution type.

In some embodiments, methods can further comprise: determining, by the processing resource using the second trained model, a predicted second confidence level of an accuracy of a second inferred acquisition execution type; and wherein the filtering of the set of one or more items comprises filtering, based on a threshold relationship between the first confidence level of the accuracy of the first inferred acquisition execution type and the second confidence level of accuracy of the second inferred acquisition execution type, the set of one or more items to the sub-set of one or more items that satisfy the in-session search and comply with both the first inferred acquisition execution type and the second inferred acquisition execution type.

Some embodiments provide one or more non-transitory machine readable mediums storing instructions that, when executed, cause a processing resource to: during a current session between a client and a prediction platform interface, determine, by the processing resource executing instructions stored on a readable medium, acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with numerous different item acquisition transactions by clients and respective acquisition execution type, of a plurality of potential acquisition execution types, for each of the numerous different item acquisition transactions; trigger a query to a first trained model, the query including the acquisition execution intent prediction features; identify, by the processing resource using the first trained model, a first inferred acquisition execution type, of the plurality of potential acquisition execution types, that the client intends to receive an item to be acquired during the current session based on the acquisition execution intent prediction features; repeatedly evaluate, by the processing resource during the current session, according to a predefined interval whether to trigger a refresh of the first inferred acquisition execution type as a function of a change to one or more of the acquisition execution intent prediction features since a preceding triggered query to the first trained model; trigger, in response to the repeated evaluations, a first refresh query to the first trained model and according to the predefined interval; identify, using the first trained model, a second inferred acquisition execution type, of the plurality of potential acquisition execution types, that the client intends to receive the item to be acquired during the current session based on the acquisition execution intent prediction features; identify, based on an in-session search, a set of one or more items corresponding to the in-session search; filter the set of one or more items to a sub-set of one or more items that satisfy the in-session search and comply with the second inferred acquisition execution type; and control data communications transceiver to transmit to a remote client computing device, via a distributed communications network, response data in a predefined standard format consistent with the prediction platform interface in controlling the remote client computing device to render content comprising the sub-set of one or more items at a prominent results position within the rendered content consistent with a predefined layout of the prediction platform interface.

Some embodiments provide systems to control digital communications between electronic system components over a distributed network comprising: a data communications transceiver communicatively coupled with a distributed communications network; a processing resource communicatively coupled with the data communications transceiver; and a machine readable medium storing instructions that, when executed by the processing resource, cause the processing resource to: during a current session between a user and a prediction platform interface, determine fulfillment intent prediction features based on data received from a database of historic user data and in session data obtained during the current session based on actions executed in the current session, wherein the historic user data comprises historic virtual interaction behavior data associated with numerous different users executing respective data retrieval processes including historic searches, historic add to cart actions, historic purchase data associated with the numerous different purchase transactions by users and respective fulfillment type, of a plurality of potential fulfillment types, for each of numerous different purchase transactions; trigger a query to a first trained model, the query including the fulfillment intent prediction features; identify, using the first trained model, a first inferred fulfillment type, of the plurality of potential fulfillment types, that the user intends to receive a product ordered during the current session based on the fulfillment intent prediction features; repeatedly evaluate, during the current session, according to a predefined interval whether to trigger a refresh of the first inferred fulfillment type as a function of a change to one or more of the fulfillment intent prediction features since a preceding triggered query to the first trained model; trigger, in response to the repeated evaluations, a first refresh query to the first trained model and according to the predefined interval; identify, using the first trained model, a second inferred fulfillment type, of the plurality of potential fulfillment types, that the user intends to receive the product ordered during the current session based on the fulfillment intent prediction features; identify, based on an in-session search, a set of one or more products corresponding to the in-session search; filter the set of one or more products to a sub-set of one or more products that satisfy the in-session search and comply with the second inferred fulfillment type; and control the data communications transceiver to transmit to a remote user computing device, via the distributed communications network, response data in a predefined standard format consistent with the prediction platform interface in controlling the remote user computing device to render content comprising the sub-set of one or more products at a prominent results position within the rendered content consistent with a predefined layout of the prediction platform interface.

Some embodiments provide methods of controlling digital communications between electronic system components over a distributed network, the method comprising: during a current session between a user and a prediction platform interface, determining, by a processing resource executing instructions stored on a readable medium, fulfillment intent prediction features based on data received from a database of historic user data and in session data obtained during the current session based on actions executed in the current session, wherein the historic user data comprises historic virtual interaction behavior data associated with numerous different users executing respective data retrieval processes including historic searches, historic add to cart actions, historic purchase data associated with numerous different purchase transactions by users and respective fulfillment type, of a plurality of potential fulfillment types, for each of the numerous different purchase transactions; triggering a query to a first trained model, the query including the fulfillment intent prediction features; identifying, by the processing resource using the first trained model, a first inferred fulfillment type, of the plurality of potential fulfillment types, that the user intends to receive a product ordered during the current session based on the fulfillment intent prediction features; repeatedly evaluating, by the processing resource during the current session, according to a predefined interval whether to trigger a refresh of the first inferred fulfillment type as a function of a change to one or more of the fulfillment intent prediction features since a preceding triggered query to the first trained model; triggering, in response to the repeated evaluations, a first refresh query to the first trained model and according to the predefined interval; identifying, using the first trained model, a second inferred fulfillment type, of the plurality of potential fulfillment types, that the user intends to receive the product ordered during the current session based on the fulfillment intent prediction features; identifying, based on an in-session search, a set of one or more products corresponding to the in-session search; filtering the set of one or more products to a sub-set of one or more products that satisfy the in-session search and comply with the second inferred fulfillment type; and controlling data communications transceiver to transmit to a remote user computing device, via a distributed communications network, response data in a predefined standard format consistent with the prediction platform interface in controlling the remote user computing device to render content comprising the sub-set of one or more products at a prominent results position within the rendered content consistent with a predefined layout of the prediction platform interface.

Further, some embodiments provide a non-transitory machine readable medium storing instructions that, when executed, cause a processing resource to, during a current session between a user and a prediction platform interface: determine, by the processing resource executing instructions stored on a readable medium, fulfillment intent prediction features based on data received from a database of historic user data and in session data obtained during the current session based on actions executed in the current session, wherein the historic user data comprises historic virtual interaction behavior data associated with numerous different users executing respective data retrieval processes including historic searches, historic add to cart actions, historic purchase data associated with numerous different purchase transactions by users and respective fulfillment type, of a plurality of potential fulfillment types, for each of the numerous different purchase transactions; trigger a query to a first trained model, the query including the fulfillment intent prediction features; identify, by the processing resource using the first trained model, a first inferred fulfillment type, of the plurality of potential fulfillment types, that the user intends to receive a product ordered during the current session based on the fulfillment intent prediction features; repeatedly evaluate, by the processing resource during the current session, according to a predefined interval whether to trigger a refresh of the first inferred fulfillment type as a function of a change to one or more of the fulfillment intent prediction features since a preceding triggered query to the first trained model; trigger, in response to the repeated evaluations, a first refresh query to the first trained model and according to the predefined interval; identify, using the first trained model, a second inferred fulfillment type, of the plurality of potential fulfillment types, that the user intends to receive the product ordered during the current session based on the fulfillment intent prediction features; identify, based on an in-session search, a set of one or more products corresponding to the in-session search; filter the set of one or more products to a sub-set of one or more products that satisfy the in-session search and comply with the second inferred fulfillment type; and control data communications transceiver to transmit to a remote user computing device, via a distributed communications network, response data in a predefined standard format consistent with the prediction platform interface in controlling the remote user computing device to render content comprising the sub-set of one or more products at a prominent results position within the rendered content consistent with a predefined layout of the prediction platform interface.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

The invention claimed is:

1. A system to control digital communications between electronic system components over a distributed network, the system comprising:

a data communications transceiver communicatively coupled with a distributed communications network;

a processing resource communicatively coupled with the data communications transceiver; and a machine readable medium storing instructions that, when executed by the processing resource, cause the processing resource to:

during a current session between a client and a prediction platform interface, determine acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with the numerous different item acquisition transactions by clients and respective acquisition execution type, of a plurality of potential acquisition execution types, for each of numerous different item acquisition transactions;

trigger a query to a first trained model, the query including the acquisition execution intent prediction features;

identify, using the first trained model, a first inferred acquisition execution type, of the plurality of potential acquisition execution types, that the client intends to receive an item to be acquired during the current session based on the acquisition execution intent prediction features;

repeatedly evaluate, during the current session, according to a predefined interval whether to trigger a refresh of the first inferred acquisition execution type as a function of a change to one or more of the acquisition execution intent prediction features since a preceding triggered query to the first trained model;

trigger, in response to the repeated evaluations, a first refresh query to the first trained model and according to the predefined interval;

identify, using the first trained model, a second inferred acquisition execution type, of the plurality of potential acquisition execution types, that the client intends to receive the item to be acquired during the current session based on the acquisition execution intent prediction features;

identify, based on an in-session search, a set of one or more items corresponding to the in-session search;

filter the set of one or more items to a sub-set of one or more items that satisfy the in-session search and comply with the second inferred acquisition execution type; and control the data communications transceiver to transmit to a remote client computing device, via the distributed communications network, response data in a predefined standard format consistent with the prediction platform interface in controlling the remote client computing device to render content comprising the sub-set of one or more items at a prominent results position within the rendered content consistent with a predefined layout of the prediction platform interface.

2. The system of claim 1, wherein the instructions, when executed, cause the processing resource to:

store the second inferred acquisition execution type in a cache memory;

control the data communications transceiver to receive, during the current session and subsequent to the identification of the second inferred acquisition execution type, a request of an acquisition execution type from a data query application executed on the remote client computing device; and access, without triggering an additional refresh query to the first trained model, the cache memory and retrieve the second inferred acquisition execution type, and control the data communications transceiver to communicate the second inferred acquisition execution type to the remote client computing device for use by the data query application.

3. The system of claim 2, wherein the determining the acquisition execution intent prediction features comprises repeatedly determining, during the current session, the acquisition execution intent prediction features at each repetition of the predefined interval independent of requests for an acquisition execution type.

4. The system of claim 3, wherein the repeatedly evaluating whether to trigger the refresh of the first inferred acquisition execution type comprises repeatedly determining, during the current session and in response to different trigger actions from applications executed on the remote client computing device, whether there is a change to a first acquisition execution intent prediction feature, of the acquisition execution intent prediction features, relative to the preceding triggered query to the first trained model; and wherein the triggering the first refresh query comprises triggering the first refresh query to the first trained model in response to a first trigger action, of the different trigger actions, and when there is the change to the first acquisition execution intent prediction feature relative to the preceding triggered query to the first trained model.

5. The system of claim 3, wherein the instructions, when executed, cause the processing resource to further prevent a triggering of a potential refresh query to the first trained model in response to a first evaluation confirming a lack of a threshold change to a first acquisition execution intent prediction feature of the acquisition execution intent prediction features.

6. The system of claim 2, wherein the instructions, when executed, cause the processing resource to:

for each request for an acquisition execution type, received during a first interval while the second inferred acquisition execution type is stored in the cache memory as a most recent interred acquisition execution type, accessing the cache memory and retrieving the second inferred acquisition execution type, and controlling the data communications transceiver to communicate the second inferred acquisition execution type, without triggering an additional refresh query to the first trained model, to the remote client computing device for use by a respective one of one or more application submitting a request for the acquisition execution type.

7. The system of claim 2, wherein the instructions when executed by the processing resource cause the processing resource to:

determine, using a second trained model, a predicted first confidence level of an accuracy of the first inferred acquisition execution type; and filter the set of one or more items by varying the filtering as a function of the first confidence level of accuracy of the first inferred acquisition execution type.

8. The system of claim 7, wherein the instructions when executed by the processing resource cause the processing resource to:

determine using the second trained model a predicted second confidence level of an accuracy of a second inferred acquisition execution type; and filtering of the set of one or more items by filtering, based on a threshold relationship between the first confidence level of the accuracy of the first inferred acquisition execution type and the second confidence level of accuracy of the second inferred acquisition execution type, the set of one or more items to the sub-set of one or more items that satisfy the in-session search and comply with both the first inferred acquisition execution type and the second inferred acquisition execution type.

9. A method of controlling digital communications between electronic system components over a distributed network, the method comprising:

during a current session between a client and a prediction platform interface, determining, by a processing resource executing instructions stored on a readable medium, acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with numerous different item acquisition transactions by clients and respective acquisition execution type, of a plurality of potential acquisition execution types, for each of the numerous different item acquisition transactions;

triggering a query to a first trained model, the query including the acquisition execution intent prediction features;

identifying, by the processing resource using the first trained model, a first inferred acquisition execution type, of the plurality of potential acquisition execution types, that the client intends to receive an item to be acquired during the current session based on the acquisition execution intent prediction features;

repeatedly evaluating, by the processing resource during the current session, according to a predefined interval whether to trigger a refresh of the first inferred acquisition execution type as a function of a change to one or more of the acquisition execution intent prediction features since a preceding triggered query to the first trained model;

triggering, in response to the repeated evaluations, a first refresh query to the first trained model and according to the predefined interval;

identifying, using the first trained model, a second inferred acquisition execution type, of the plurality of potential acquisition execution types, that the client intends to receive the item to be acquired during the current session based on the acquisition execution intent prediction features;

identifying, based on an in-session search, a set of one or more items corresponding to the in-session search;

filtering the set of one or more items to a sub-set of one or more items that satisfy the in-session search and comply with the second inferred acquisition execution type; and controlling data communications transceiver to transmit to a remote client computing device, via a distributed communications network, response data in a predefined standard format consistent with the prediction platform interface in controlling the remote client computing device to render content comprising the sub-set of one or more items at a prominent results position within the rendered content consistent with a predefined layout of the prediction platform interface.

10. The method of claim 9, further comprising:

storing the second inferred acquisition execution type in a cache memory;

controlling the data communications transceiver to receive, during the current session and subsequent to the identification of the second inferred acquisition execution type, a request of an acquisition execution type from a data query application executed on the remote client computing device; and accessing, without triggering an additional refresh query to the first trained model, the cache memory and retrieving the second inferred acquisition execution type, and controlling the data communications transceiver to communicate the second inferred acquisition execution type to the remote client computing device for use by the data query application.

11. The method of claim 10, wherein the determining the acquisition execution intent prediction features comprises repeatedly determining, during the current session, the acquisition execution intent prediction features at each repetition of the predefined interval independent of requests for an acquisition execution type.

12. The method of claim 11, wherein the repeatedly evaluating whether to trigger the refresh of the first inferred acquisition execution type comprises repeatedly determining, during the current session and in response to different trigger actions from applications executed on the remote client computing device, whether there is a change to a first acquisition execution intent prediction feature, of the acquisition execution intent prediction features, relative to the preceding triggered query to the first trained model; and wherein the triggering the first refresh query comprises triggering the first refresh query to the first trained model in response to a first trigger action, of the different trigger actions, and when there is the change to the first acquisition execution intent prediction feature relative to the preceding triggered query to the first trained model.

13. The method of claim 11, further comprising:

preventing, by the processing resource, a triggering of a potential refresh query to the first trained model in response to a first evaluation confirming a lack of a threshold change to a first acquisition execution intent prediction feature of the acquisition execution intent prediction features.

14. The method of claim 10, further comprising:

accessing, for each request for an acquisition execution type, received during a first interval while the second inferred acquisition execution type is stored in the cache memory as a most recent interred acquisition execution type, the cache memory and retrieving the second inferred acquisition execution type, and controlling the data communications transceiver to communicate the second inferred acquisition execution type, without triggering an additional refresh query to the first trained model, to the remote client computing device for use by a respective one of one or more application submitting a request for the acquisition execution type.

15. The method of claim 10, further comprising:

determining, by the processing resource using a second trained model, a predicted first confidence level of an accuracy of the first inferred acquisition execution type; and wherein the filtering the set of one or more items by varying the filtering as a function of the first confidence level of accuracy of the first inferred acquisition execution type.

16. The method of claim 15, further comprising:

determining, by the processing resource using the second trained model, a predicted second confidence level of an accuracy of a second inferred acquisition execution type; and wherein the filtering of the set of one or more items comprises filtering, based on a threshold relationship between the first confidence level of the accuracy of the first inferred acquisition execution type and the second confidence level of accuracy of the second inferred acquisition execution type, the set of one or more items to the sub-set of one or more items that satisfy the in-session search and comply with both the first inferred acquisition execution type and the second inferred acquisition execution type.

17. A non-transitory machine readable medium storing instructions that, when executed, cause a processing resource to:

during a current session between a client and a prediction platform interface, determine, by the processing resource executing instructions stored on a readable medium, acquisition execution intent prediction features based on data received from a database of historic client data and in session data obtained during the current session based on actions executed in the current session, wherein the historic client data comprises historic virtual interaction behavior data associated with numerous different clients executing respective data retrieval processes including historic searches, historic acquisition intention actions, historic item acquisition data associated with numerous different item acquisition transactions by clients and respective acquisition execution type, of a plurality of potential acquisition execution types, for each of the numerous different item acquisition transactions;

trigger a query to a first trained model, the query including the acquisition execution intent prediction features;

identify, by the processing resource using the first trained model, a first inferred acquisition execution type, of the plurality of potential acquisition execution types, that the client intends to receive an item to be acquired during the current session based on the acquisition execution intent prediction features;

repeatedly evaluate, by the processing resource during the current session, according to a predefined interval whether to trigger a refresh of the first inferred acquisition execution type as a function of a change to one or more of the acquisition execution intent prediction features since a preceding triggered query to the first trained model;

trigger, in response to the repeated evaluations, a first refresh query to the first trained model and according to the predefined interval;

identify, using the first trained model, a second inferred acquisition execution type, of the plurality of potential acquisition execution types, that the client intends to receive the item to be acquired during the current session based on the acquisition execution intent prediction features;

identify, based on an in-session search, a set of one or more items corresponding to the in-session search;

filter the set of one or more items to a sub-set of one or more items that satisfy the in-session search and comply with the second inferred acquisition execution type; and control data communications transceiver to transmit to a remote client computing device, via a distributed communications network, response data in a predefined standard format consistent with the prediction platform interface in controlling the remote client computing device to render content comprising the sub-set of one or more items at a prominent results position within the rendered content consistent with a predefined layout of the prediction platform interface.

18. The medium of claim 17, further comprising instructions executable by the processing resource further comprising:

storing the instructions that, when executed, cause the processing resource to:

storing the second inferred acquisition execution type in a cache memory;

controlling the data communications transceiver to receive, during the current session and subsequent to the identification of the second inferred acquisition execution type, a request of an acquisition execution type from a data query application executed on the remote client computing device; and accessing, without triggering an additional refresh query to the first trained model, the cache memory and retrieving the second inferred acquisition execution type, and controlling the data communications transceiver to communicate the second inferred acquisition execution type to the remote client computing device for use by the data query application.

19. The medium of claim 18, wherein the instructions comprising the determining the acquisition execution intent prediction features comprises repeatedly determining, during the current session, the acquisition execution intent prediction features at each repetition of the predefined interval independent of requests for an acquisition execution type.

20. The medium of claim 19, wherein the instructions comprising the repeatedly evaluating whether to trigger the refresh of the first inferred acquisition execution type comprises repeatedly determining, during the current session and in response to different trigger actions from applications executed on the remote client computing device, whether there is a change to a first acquisition execution intent prediction feature, of the acquisition execution intent prediction features, relative to the preceding triggered query to the first trained model; and wherein the triggering the first refresh query comprises triggering the first refresh query to the first trained model in response to a first trigger action, of the different trigger actions, and when there is the change to the first acquisition execution intent prediction feature relative to the preceding triggered query to the first trained model.

* * * * *